US007340591B1

(12) United States Patent
Pechanek et al.

(10) Patent No.: US 7,340,591 B1
(45) Date of Patent: Mar. 4, 2008

(54) PROVIDING PARALLEL OPERAND FUNCTIONS USING REGISTER FILE AND EXTRA PATH STORAGE

(75) Inventors: Gerald George Pechanek, Cary, NC (US); Patrick R. Marchand, Apex, NC (US); Larry D. Larsen, Raleigh, NC (US)

(73) Assignee: Altera Corporation, San Jose, CA (US)

( * ) Notice: Subject to any disclaimer, the term of this patent is extended or adjusted under 35 U.S.C. 154(b) by 142 days.

(21) Appl. No.: 10/976,145

(22) Filed: Oct. 28, 2004

(51) Int. Cl.
*G06F 9/30* (2006.01)
(52) U.S. Cl. .................. 712/217; 712/24; 712/200; 712/215; 712/225; 712/21
(58) Field of Classification Search ............... 712/217, 712/216, 1, 23, 24, 200, 215, 225, 20, 21, 712/22
See application file for complete search history.

(56) References Cited

U.S. PATENT DOCUMENTS 5,056,015 A * 10/1991 Baldwin et al. ............. 703/27
5,513,363 A * 4/1996 Kumar et al. ................ 712/1
6,446,190 B1 * 9/2002 Barry et al. ................. 712/24

* cited by examiner

*Primary Examiner*—Tonia L. Meonske
(74) *Attorney, Agent, or Firm*—Priest & Goldstein, PLLC

(57) ABSTRACT

A number of architectural and implementation approaches are described for using extra path (Epath) storage that operate in conjunction with a compute register file to obtain increased instruction level parallelism that more flexibly addresses the requirements of high performance algorithms. A processor that supports a single load data to a register file operation can be doubled in load capability through the use of an extra path storage, an additional independently addressable data memory path, and instruction decode information that specifies two independently load data operations. By allowing the extra path storage to be accessible by arithmetic facilities, the increased data bandwidth can be fully utilized. In addition, flexible approaches to specifying the extra path storage, as a register, as a file, as a stack, as a tightly coupled input/output data interface path, and in conjunction with a scalable register file, can be implemented providing numerous options and capabilities for evolving processor designs.

16 Claims, 20 Drawing Sheets

FIG. 7A

XVX ENCODING (EXECUTE VLIW WITH OPTIONAL OPERAND/RESULT EPATH) — 700

| 31 30 29 | 28 27 26 25 | 24 | 23 22 | 21 | 20 | 19 | 18 | 17 16 | 15 14 13 12 11 10 | 9 | 8 | 7 6 5 4 3 2 1 0 |
|---|---|---|---|---|---|---|---|---|---|---|---|---|
| Group S/P | Ctr1Op | VX | UAF | LE | SE | XE | Csel | Epsel | S L A M D | Vb | K | VinOffs |

SYNTAX/OPERATION

| INSTRUCTION | OPERANDS | OPERATION |
|---|---|---|
| XVX.[SP] | V[01], VIMOFFS, E={S\|AMD}, F=[AMDN], LE, SE, XE, Csel, Epsel, K | AS SPECIFIED BY LE, SE, XE, Csel, Epsel, AND K USE THE CRF OR EPATH REGISTERS AND EXECUTE {V[01]+VIMOFFS}[SU] IF (E=S) EXECUTE {V[01]+VIMOFFS}[LU] IF (E=L) EXECUTE {V[01]+VIMOFFS}[ALU] IF (E=A) EXECUTE {V[01]+VIMOFFS}[MAU] IF (E=M) EXECUTE {V[01]+VIMOFFS}[DSU] IF (E=D) {V[01]+VIMOFFS}[UAF] → ALU IF (F= OR F=A) {V[01]+VIMOFFS}[UAF] → MAU IF (F=M) {V[01]+VIMOFFS}[UAF] → DSU IF (F=D) {V[01]+VIMOFFS}[UAF] → NONE IF (F=N) |

FIG. 8

| Ctrlop | 4 | FLOW CONTROL OPERATION<br>0000 = EPLOOP, EPLOOP1<br>0001 = RET<br>0010 = CALL<br>0011 = JMP<br>0100 = LV/SETV<br>0101 = XV<br>0110 = RESERVED<br>0111 = XVX ~810<br>1000 = RESERVED<br>1001 = RETI<br>1010 = SYSCALL<br>1011 = RESERVED<br>1100 = RESERVED<br>1101 = RESERVED<br>1110 = NOP<br>1111 = SVC |
|---|---|---|

800

FIG. 11
DOUBLE LOAD INSTRUCTIONS

| INSTRUCTION | 31 | 30 | 29 | 28 | 27 26 25 | 24 | 23 22 | 21 | 20 19 18 | 17 | 16 | 15 | 14 | 13 | 12 | 11 | 10 | 9 | 8 | 7 | 6 | 5 4 3 | 2 | 1 | 0 |
|---|---|---|---|---|---|---|---|---|---|---|---|---|---|---|---|---|---|---|---|---|---|---|---|---|---|
| DLBRAK=LBRAKK+LNX DLBRAIU=LBRIA+LDAU | Group | S/P | L/S | 111 | CE1 | SIZE | 0 | Rt / Rte / AtMRt | 0 | Ae | MOD/ LOAD | Ltype 1 | SIGN EXT | SCALE | PRE-DEC/ POST INC | UPDATE7[2:1] | UPDATE7[6:3] | Ao | UPDATE7[0] |
| DLBRIT=LBRI1+LII DLBRIOU=LBRIUI+LIUI | Group | S/P | L/S | 111 | CE1 | SIZE | 0 | Rt / Rte / AtMRt | 0 | An | | Ltype 2 | SIGN EXT | SCALE | PRE/ POST | DEC/ INC | IMM/ REG =0 | | UPDATE7 |
| DLBRIT=LBRI+LI DLBRIU=LBRIU+LIU | Group | S/P | L/S | 111 | CE1 | SIZE | 0 | Rt / Rte / AtMRt | 0 | An | | Ltype 2 | SIGN EXT | SCALE | PRE/ POST | DEC/ INC | IMM/ REG =1 | UPOT An =-1 | Rz/ Az | Rz | 0 | 0 | Az |
| DLBRITBL=LBRITBL+LJ S/P=0 DLBRITBL=LBRITBL+LTBL S/P=1 | Group | S/P | L/S | 111 | CE1 | SIZE | 0 | Rt / Rte / AtMRt | 0 | An | | Ltype 2 | SIGN EXT | SCALE =1 | S/0 =0 | DEC/ INC | IMM/ REG =1 | UPOT An =0 | Rz/ Az | Rz | 0 | 0 | Az |

XYX2 ENCODING (EXECUTE VLIW WITH OPTIONAL MULTIPLE I/O EPATH REGISTER FILES) — 1600

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| Group | | S/P | | CtrlOp | | | VX | | UAF | | RF1 | | CE2 | | Ep | | 0 | SU | LU | ALU | MAU | DSU | Vb | K | | | | VImOffs | | | |

1610 — 1605

SYNTAX/OPERATION — 1620

| INSTRUCTION | OPERANDS | OPERATION |
|---|---|---|
| XVX2.[SP] | V[01], VIMOFFS, E={SLAMD}, F=[AMON], K, Ep | AS SPECIFIED BY Ep, USE THE CRF OR I/O EPATH REGISTERS<br>IF Ep=0:<br>EXECUTE USING CRF (V[01]+VIMOFFS)[SU] IF (E=S)<br>EXECUTE USING CRF (V[01]+VIMOFFS)[LU] IF (E=L)<br>EXECUTE USING CRF (V[01]+VIMOFFS)[ALU] IF (E=A)  — 1622<br>EXECUTE USING CRF (V[01]+VIMOFFS)[MAU] IF (E=M)<br>EXECUTE USING CRF (V[01]+VIMOFFS)[DSU] IF (E=D)<br>ELSE Ep=1,2, OR 3:<br>EXECUTE USING IORF_Ep (V[01]+VIMOFFS)[SU] IF (E=S)<br>EXECUTE USING IORF_Ep (V[01]+VIMOFFS)[LU] IF (E=L)<br>EXECUTE USING IORF_Ep (V[01]+VIMOFFS)[ALU] IF (E=A)  — 1624<br>EXECUTE USING IORF_Ep (V[01]+VIMOFFS)[MAU] IF (E=M)<br>EXECUTE USING IORF_Ep (V[01]+VIMOFFS)[DSU] IF (E=D)<br>(V[01]+VIMOFFS)[UAF] → ALU IF (F= OR F=A)<br>(V[01]+VIMOFFS)[UAF] → MAU IF (F=M)<br>(V[01]+VIMOFFS)[UAF] → DSU IF (F=D)<br>(V[01]+VIMOFFS)[UAF] → NONE IF (F=N) |

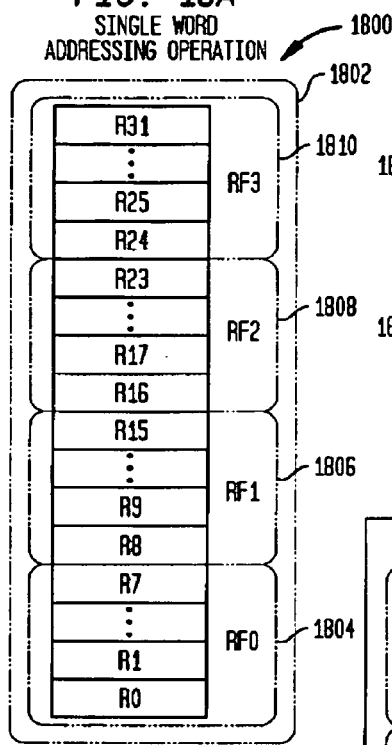
FIG. 18A SINGLE WORD ADDRESSING OPERATION
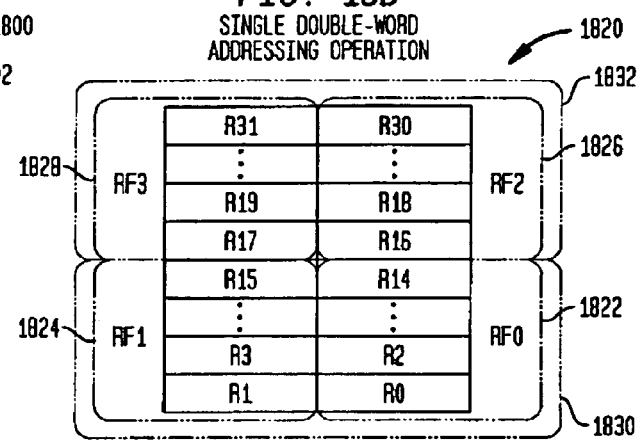
FIG. 18B SINGLE DOUBLE-WORD ADDRESSING OPERATION
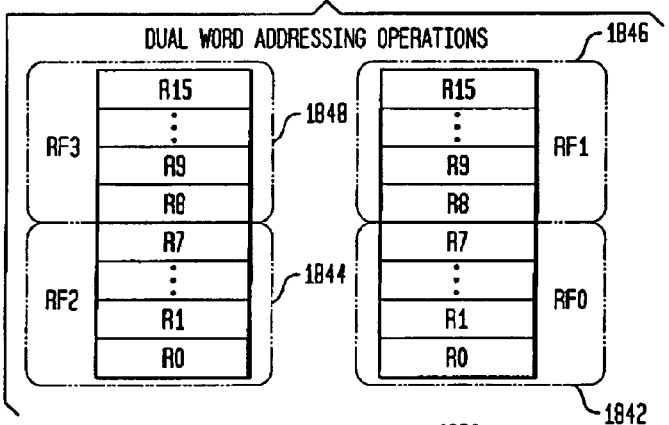
FIG. 18C DUAL WORD ADDRESSING OPERATIONS
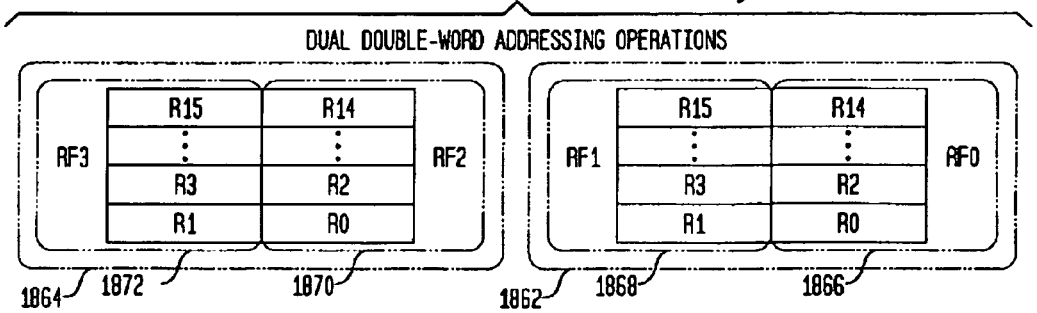
FIG. 18D DUAL DOUBLE-WORD ADDRESSING OPERATIONS

FIG. 19A

| 31 30 | 29 28 27 | 26 25 24 23 22 21 | 20 19 18 17 | 16 | 15 14 13 12 | 11 | 10 9 8 7 | 6 5 4 3 | 2 1 0 |
|---|---|---|---|---|---|---|---|---|---|
| GROUP | S/P Unit | Opcode | Rt / Rte | 0 | Rx / Rxe | 0 | Ry / Rye | CE3 | DType |

1902 — Rte 1912
1904 — Rxe 1914
1906 — Rye 1916
1918 — DType
1900

FIG. 19B

| | | |
|---|---|---|
| A4 | 5-BIT OPERAND ADDRESSES Rt, Rx, AND Ry | AN OPERAND ADDRESS FIELD |
| A3 | | |
| A2 | RFaddress | WORD ADDRESS (32 WORDS) |
| A1 | | |
| A0 | RFselect | RF SELECTION AND WORD ADDRESSING FIELDS |
| 0 | RFaddress | DOUBLE WORD ADDRESS (EVEN) (16 DOUBLE-WORDS) |
| x | RFG | RF GROUP SELECTION AND DOUBLE-WORD ADDRESSING FIELDS |

| B0 0 | | |
|---|---|---|
| B0 1 | H0 | |
| B0 2 | | W0 |
| B0 3 | H1 | |
| B0 4 | | | D0 |
| B0 5 | H2 | W1 |
| B0 6 | | |
| B0 7 | H3 | |

1950, 1952

PROVIDING PARALLEL OPERAND FUNCTIONS USING REGISTER FILE AND EXTRA PATH STORAGE

FIELD OF THE INVENTION

The present invention relates generally to techniques for improving the number of concurrent operations a processor can support. More particularly, the present invention addresses advantageous methods and apparatus for providing increased memory bandwidth through additional parallel memory operand functions in a very long instruction word (VLIW) processor.

BACKGROUND OF THE INVENTION

Processor performance is highly dependent upon the memory bandwidth that is available for accessing data to be processed. For example, the number of concurrent operations the processor is able to support is directly related to the availability of data accessible through the processor's memory interface. Providing adequate memory bandwidth at a low cost is a difficult problem that must be addressed in the design of any new processor and is typically a very difficult problem to address in the design of higher performing next generations of existing processors.

In a load/store register file centric processor there is typically a fixed register file (RF) capacity, fixed number of RF ports, and maximum memory bandwidth available for use by the instruction set. For example, consider a processor with a fixed RF capacity of 16×64-bits and which needs to support a maximum of 64-bit load operations from memory and 64-bit store operations from memory concurrently every cycle from the local data memories. To accomplish 64-bit load and store capability, a dedicated 64-bit load port and a dedicated 64-bit store port is required on the RF and an architecture that allows concurrent load and store instruction issuing. To extend beyond this capability in the same architectural manner would require increasing the number of register file ports or increasing the data width, both approaches requiring corresponding architectural changes. In addition, these changes can be counterproductive. For example, increasing the number of register file ports in a single RF as part of an attempt to resolve the memory bandwidth limit, increases the implementation size of the register file and tends to slow it down.

With the advent of low power processors for mobile battery operated devices, increasing the processor's memory bandwidth by increasing the processor clock rate is at odds with lowering the device's power requirements, because the device's power use can be highly dependent upon the processor's operating frequency. In addition, with an existing processor architecture, there usually is a significant amount of code and tools that have been developed, such that making changes to the processor's architecture for the purposes of improving performance and reducing power use becomes increasingly difficult.

SUMMARY OF THE INVENTION

In one or more of its several aspects, the present invention addresses problems such as those described above. In one of its aspects, the present invention describes a parallel operand function processor having a register file with a plurality of addressable registers holding at least one operand for processing and with a read port connected to execution facilities. The parallel operand function processor also having an extra path (Epath) register with an identifying address independent of the register file, holding an operand for processing, and with an output connected to the execution facilities. The processor also may suitably employ a first data memory with a read port connected to the register file and a second data memory with a read port connected to the Epath register. The processor uses two load facilities, an arithmetic facility, and instruction decode information. Instruction load decode information and instruction arithmetic decode information specify operations to, in parallel, load an operand from the first data memory to the register file, load an operand from the second data memory to the Epath register, fetch an operand from the register file to the execution facilities, fetch an operand from the Epath register to the execution facilities, and operate on the fetched operands in the execution facilities.

In another aspect of the present invention, the memory bandwidth is doubled by using two load operations that can execute concurrently, with one load operation targeting the register file to load data and the other load operation targeting the load Epath register to load data. Further aspects of the invention include methods to increase the local operand storage capacity, to provide alternative means of interfacing with the processor, and to provide for increased computational parallelism for improved low-power performance as described further below.

For example, a software pipelining technique using the load Epath register, and improvements to the processor architecture are described herein. Such improvements include improvements to the architecture's supported instructions. These techniques may advantageously provide increased memory bandwidth and increased local operand storage capacity. They also address general architectural features for improved performance. A method of incorporating the load Epath register within an architecturally defined register file is also described herein.

Another aspect of the present invention addresses techniques to increase the memory bandwidth, of a processor with an existing instruction set architecture, without increasing the number of register file ports in a single register file and to alleviate typically limited register file capacity. These techniques generally provide improvements to the memory bandwidth in short pipeline processors, which do not have a separate memory operand fetch pipeline stage. Also, aspects of the present invention illustrate how the memory bandwidth improvement technique can be applied to improve the coupling efficiency between an external I/O device and the processor's register file, thereby improving data streaming computations on data transferred to and from the I/O device. Techniques are also illustrated to improve instruction level parallelism to obtain improvements in memory access bandwidth and compute capabilities more suitably coupled with the various needs of different algorithms.

These and other aspects and advantages of the present invention will be apparent from the drawings and the Detailed Description which follow.

BRIEF DESCRIPTION OF THE DRAWINGS

FIG. 7A illustrates an exemplary execute VLIW expanded (XVX) instruction with optional operand Epath encoding in accordance with the present invention;

FIG. 7B illustrates an exemplary syntax/operation table for the XVX instruction of FIG. 7A in accordance with the present invention;

FIG. 8 is a flow control opcode assignment table highlighting XVX opcode in accordance with the present invention;

FIG. 11 illustrates exemplary double load instruction formats in accordance with the present invention;

FIG. 16 illustrates an exemplary XVX2 encoding format and syntax/operation table in accordance with the present invention;

FIGS. 18A-18D illustrate four configurations supported by the SRF of FIG. 17 in accordance with the present invention;

FIG. 19A illustrates an example of an arithmetic SIW in accordance with the present invention;

FIG. 19B illustrates an operand address and RF macro selection encoding of the SRF of FIG. 17 in accordance with the present invention; and FIG. 19C illustrates the data types supported by the SRF of FIG. 17 and the instructions of the type shown in FIG. 19A in accordance with the present invention.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
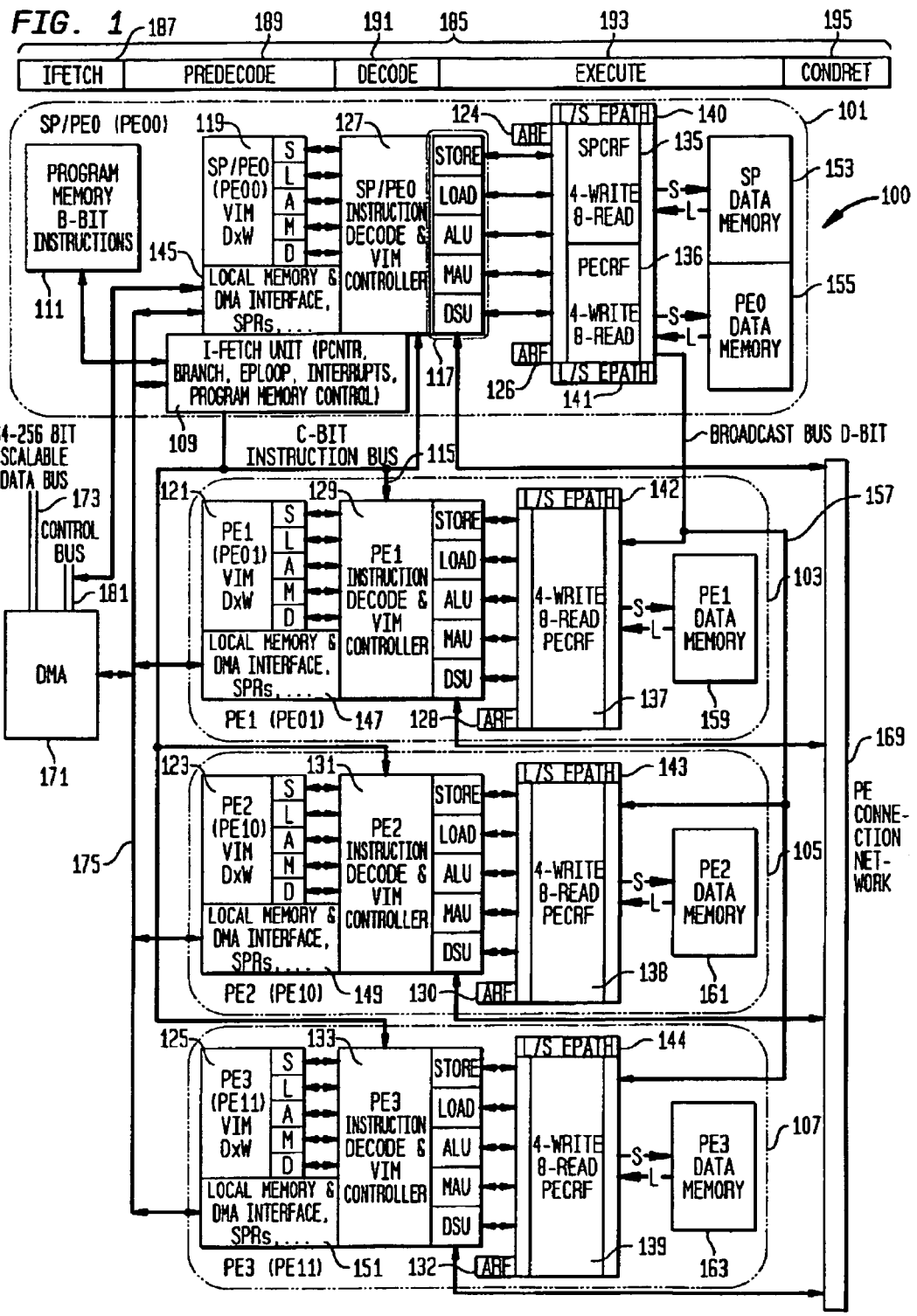
FIG. 1 illustrates a presently preferred implementation of a 2×2 indirect very long instruction word (iVLIW) processor in accordance with the present invention.

In a first embodiment of the present invention shown in FIG. 1, an exemplary 2×2 indirect VLIW (iVLIW) processor 100 is a single instruction multiple data stream (SIMD) processor. The 2×2 iVLIW processor 100 comprises a sequence processor (SP) controller combined with a processing element-0 (PE0) SP/PE0 101. Three additional PEs 103, 105, and 107, are also utilized to demonstrate architectural features and aspects of parallel operand functions in a short pipelined VLIW processor in accordance with the present invention. It is noted that the PEs can also be labeled with their matrix positions as shown in parentheses for SP/PE0 (PE00) 101, PE1 (PE01) 103, PE2 (PE10) 105, and PE3 (PE11) 107. The SP/PE0 101 contains a fetch controller 109 to allow the fetching of short instruction words (SIWs) from a B-bit instruction memory 111, where B typically is 32-bits. The fetch controller 109 provides the typical functions needed in a programmable processor such as a program counter (PCntr), branch capability, event point (EP) loop operations, and support for interrupts. It also provides the instruction memory control which could include an instruction cache if needed by an application. In addition, the SIW I-Fetch controller 109 dispatches B=32-bit SIWs to the other PEs in the system by means of the C=32-bit instruction bus 115.

In this exemplary system, common elements are used throughout to simplify the explanation, though actual implementations are not limited to the elements shown. For example, the VLIW execution units 117 in the combined SP/PE0 101 can be separated into a set of execution units optimized for a desired control function using, for example, fixed point execution units. PE0, as well as, the other PEs can be optimized for a floating point application. For the purposes of this description, it is assumed that the VLIW execution units 117 are of the same type in the SP/PE0 and the other PEs.

In a similar manner, SP/PE0 and the other PEs use a five instruction slot iVLIW architecture which contains very long instruction word memories (VIMs) 119, 121, 123, and 125 and VIM controllers 127, 129, 131, and 133, respectively. The VIM controllers receive instructions as dispatched from the SP/PE0's I-Fetch unit 109 over instruction bus 115 and generate VIM addresses and control signals required to access the iVLIWs stored in the local VIMs. Referenced instruction types are identified by the letters SLAMD in VIMs 119, 121, 123, and 125, where the letters are matched up with instruction slots as follows: store unit (SU) and (S), load unit (LU) and (L), arithmetic logic unit (ALU) and (A), multiply accumulate unit (MAU) and (M), and data select unit (DSU) and (D). When a VLIW has been selected for execution, the slot instructions are decoded and executed in the appropriate slot execution unit.

The SP and PE processor elements each contain a primary set of register files. The primary set of register files are comprised of an address register file (ARF), a compute register file (CRF), and a miscellaneous register file (MRF). The ARFs 124, 126, 128, 130, and 132, contained in the SP/PE0 and the other PEs have a common design. Each ARF is configured by architectural definition as having a specific capacity and supporting a maximum concurrency of operation. For example, an instruction set architecture for the 2×2 iVLIW processor 100 may specify an 8×32-bit register file supporting a concurrency of six read and four write operations, thereby requiring six read ports and four write ports. The address registers contain address pointers used by the LU and the SU to address memory and the ARF registers can also be concurrently accessed via the DSU, as may occur in executing a VLIW.

The compute register files 135-139, contained in the SP/PE0 and the other PEs have a common design. Each CRF is configured by architectural definition as having a specific capacity and supporting a maximum concurrency of operation. For example, instructions defined for the 2×2 iVLIW processor 100 may configure each CRF as a 16×64-bit or a 32×32-bit register file on a cycle-by-cycle basis. Compute register files serve as the data operand source and destination for all ALU, MAU, and DSU instructions and can also be accessed via the LU and the SU. As indicated in VIMs 119, 121, 123, and 125, a VLIW may consist of five instruction slots with each slot instruction requiring a independent read and write port accessibility of the CRFs. For example, the store instruction slot uses a read port, the load instruction slot uses a write port, the ALU instruction slot uses two read ports and a write port, the MAU instruction slot uses three read ports and a write port, and the DSU instruction slot uses two read ports and a write port. The arithmetic operations, if enabled in a VLIW operation, concurrently use up to seven read ports and three write ports. Supporting this level of arithmetic concurrent operations are a single memory write port and a single memory read port providing a fixed memory bandwidth. In order to support this level of concurrency plus the two CRF configurations of 16×64-bit or a 32×32-bit, each CRF 135-139 may suitably be constructed from two 16×32-bit register files, each with four 32-bit write ports and eight 32-bit read ports to support the dedicated read and write ports required by the five-issue indirect VLIW (iVLIW) architecture. From a CRF addressing perspective, the two 16×32-bit register files are further configured as an odd and an even register file pair. Further, in the 16×64-bit configuration, the read and write ports are concatenated to obtain four 64-bit write ports and eight 64-bit read ports. The 2×2 iVLIW processor 100 advantageously uses load and store (L/S) extra path (Epath) registers 140-144, as described in further detail below, to increase the memory bandwidth in accordance with the present invention.

Each MRF is configured as a 24×32-bit register file. The MRFs are not shown in FIG. 1 for convenience and since the MRF registers may be optimally distributed within an implementation according to the specific register utilizations. Miscellaneous registers include, for example, registers to retain the higher-order bytes from a multiply extended accumulate (MPXA) instruction operation, registers that store condition information, and registers for interrupt control and processing.

Due to the combined nature of the SP/PE0 101, the SP/PE0 local memory and data bus interface logic 145 handles the data processing needs for accessing data in SP data memory 153, and data in PE0 data memory 155. The SP/PE0 local memory and data bus interface logic 145 also is the controlling point of the data that is sent over the D=64-bit broadcast data bus 157. The other PEs, 103, 105, and 107 contain physical data memory units 159, 161, and 163, respectively, that have a common design. In typical SIMD processing, the data stored in the PE data memories is generally different as required by the local processing done on each PE. The interfaces to these PE data memories have a common design in PE1 103, PE2 105, and PE3 107 using local memory and DMA interface logic 147, 149 and 151, respectively. In addition to the primary set of register files, the SP and PEs also contain special purpose registers (SPRs), located in the local memory and DMA interface logic 145, 147, 149, and 151. SPRs include system configuration registers, event point registers, as well as any system specific or application specific registers.

The PE connection network 169 interconnects the PEs for data transfer communications. The PE connection network 169 generally supports data transfer operations between the CRFs in the different PEs and between the SP CRF and the PE CRFs as specified by DSU communication instructions.

The interface to a host processor, other peripheral devices, and/or external memory can be implemented in many ways. For completeness, a primary interface mechanism is contained in a direct memory access (DMA) control unit 171 that provides a scalable data bus 173 that connects to devices and interface units external to the 2×2 iVLIW processor 100. The DMA control unit 171 provides the data flow and bus arbitration mechanisms needed for these external devices to interface to the SP and local processor element memories via the multiplexed bus interface 175. A high level view of a control bus 181 is also shown in FIG. 1.

The 2×2 iVLIW processor 100 of FIG. 1 is preferably defined as a register based architecture in which all load and store instructions operate between memory and the internal registers, and all arithmetic instructions operate between the internal registers and the execution units. The 2×2 iVLIW processor 100 operates in pipeline fashion, as illustrated by a single execute cycle VLIW pipeline 185, having five basic pipeline stages with major functions of the 2×2 iVLIW processor 100 generally operating in the pipeline stages indicated. For example, an instruction fetch (Ifetch) stage 187 is primarily used for accessing SIWs from the program memory 111. A predecode stage 189 is primarily used to access an iVLIW from the VIM memories 119, 121, 123, and 125. A decode stage 191 decodes the fetched iVLIW instructions, in decode logic associated with the VIM controllers 127, 129, 131, and 133, and generates the appropriate controls signals to control the execution stage logic.

An execute stage 193 executes the iVLIW instructions on all enabled execution units, such as execution units 117 and similarly in each PE, fetching source operands from register files, which may include CRFs 135-139, and writing results back to the register files. For example, during the execute stage, enabled load instructions fetch a source operand from the local data memories, which may include 153, 155, 159, 161, and 163 and write the fetched data into the compute register files 135-139. During the execute stage, enabled store instructions fetch a source operand from the compute register files 135-139 and write the fetched data into the local data memories 153, 155, 159, 161, and 163.

A condition return stage 195 returns side effect results of execution operations as defined by the architecture. Note, some blocks such as fetch controller 109 and local memory data interface controllers 145, 147, 149, and 151, as well as, the instruction decode and VIM controllers 127, 129, 131, and 133, for example, operate as needed across pipeline boundaries. A pipeline, such as pipeline 185, operating at its supplied clock rate, places timing requirements on data memory and register file operand accesses that, in conjunction with the dedicated register file ports, restricts data memory bandwidth.

The 2×2 iVLIW processor 100 supports four major pipeline sequences as illustrated in FIGS. 2A-2D. Even though illustrated in conjunction with the 2×2 iVLIW processor 100, the pipeline stages can be generally applied, individually or in combination, to short pipeline processors, such as a uniprocessor executing only SIWs, an iVLIW uniprocessor, or array processors larger than a 2×2 array of PEs. Generally, for non-VLIW short instruction words (SIWs) that are single execute cycle instructions, the first pipeline 210, illustrated in FIG. 2A, uses four pipeline stages. These four pipeline stages consist of an Ifetch stage 212, a decode stage 214, an execute stage 216, and a single cycle condition return stage 218.

Figure 2A:
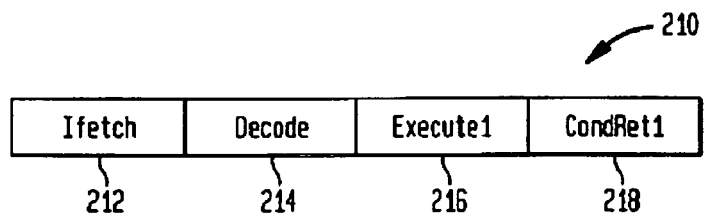
FIGS. 2A and 2B illustrate examples of a short instruction word (SIW) pipeline for single-cycle execute functions and a SIW pipeline for two-cycle execute functions, respectively, in accordance with the present invention.
Figure 2B:
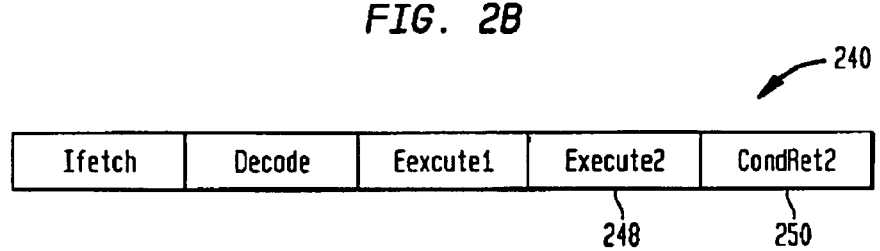

Generally, for two cycle SIWs, the second pipeline 240, illustrated in FIG. 2B, is one stage longer to accommodate the additional execution stage 248 and has a two cycle instruction condition return stage 250.

Figure 2C:
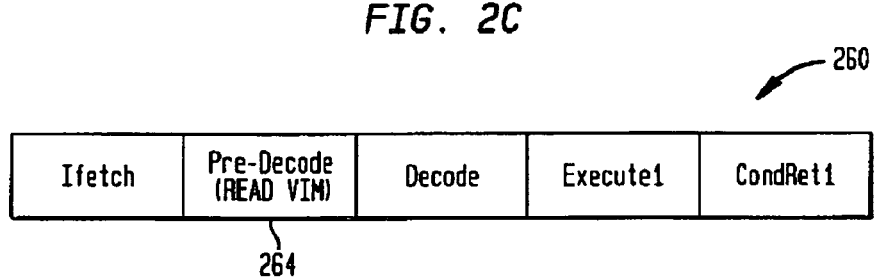
FIGS. 2C and 2D illustrate examples of an iVLIW pipeline for single-cycle execute functions and an iVLIW pipeline for two-cycle execute functions, respectively, in accordance with the present invention.
Figure 2D:
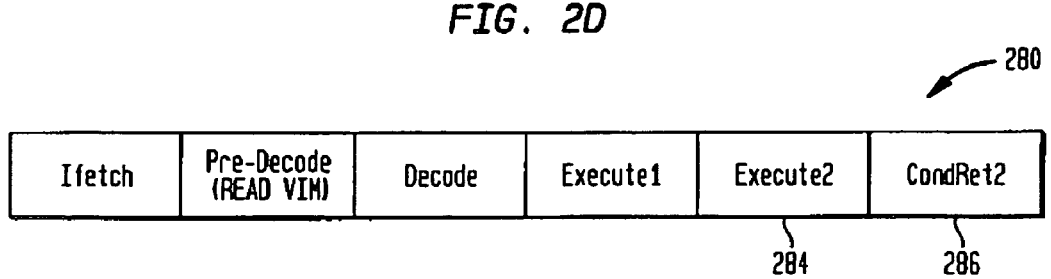

Generally, for VLIWs with single cycle execute instructions, the third pipeline 260, illustrated in FIG. 2C, expands the SIW pipeline 210 by one stage, adding a predecode stage 264, to allow an indirect VLIW access from a local VLIW memory (VIM). The third pipeline 260 is exemplary of a pipeline suitable for use as the pipeline 185 of FIG. 1. Generally, for two cycle SIWs contained in a VLIW, the fourth pipeline 280, illustrated in FIG. 2D, is one stage longer than the third pipeline 260 to accommodate the additional execution stage 284 and has a two cycle instruction condition return stage 286.

In either the SIW or VLIW case, all load and store instructions are single execute cycle operations with the memory access and register write operations both occurring in the execute1 stage of the pipeline. Also, in either the SIW or VLIW case, all single cycle arithmetic instructions fetch their operands from the internal registers, operate on the data, and write the results to internal registers in the execute1 stage of the pipeline.

One method to access additional memory operands each execute cycle according to the present invention advantageously uses a software pipelining technique and apparatus where a data memory access is pipelined with the compute functions using a pipelined operand extra path (Epath) register. It is noted that the techniques described are applicable to other processors and specifically to the SP and all PEs since each PE has all the supporting hardware and each operates its own independent pipeline, as described in further detail in U.S. Pat. No. 6,216,223, for example.

Figure 3A:
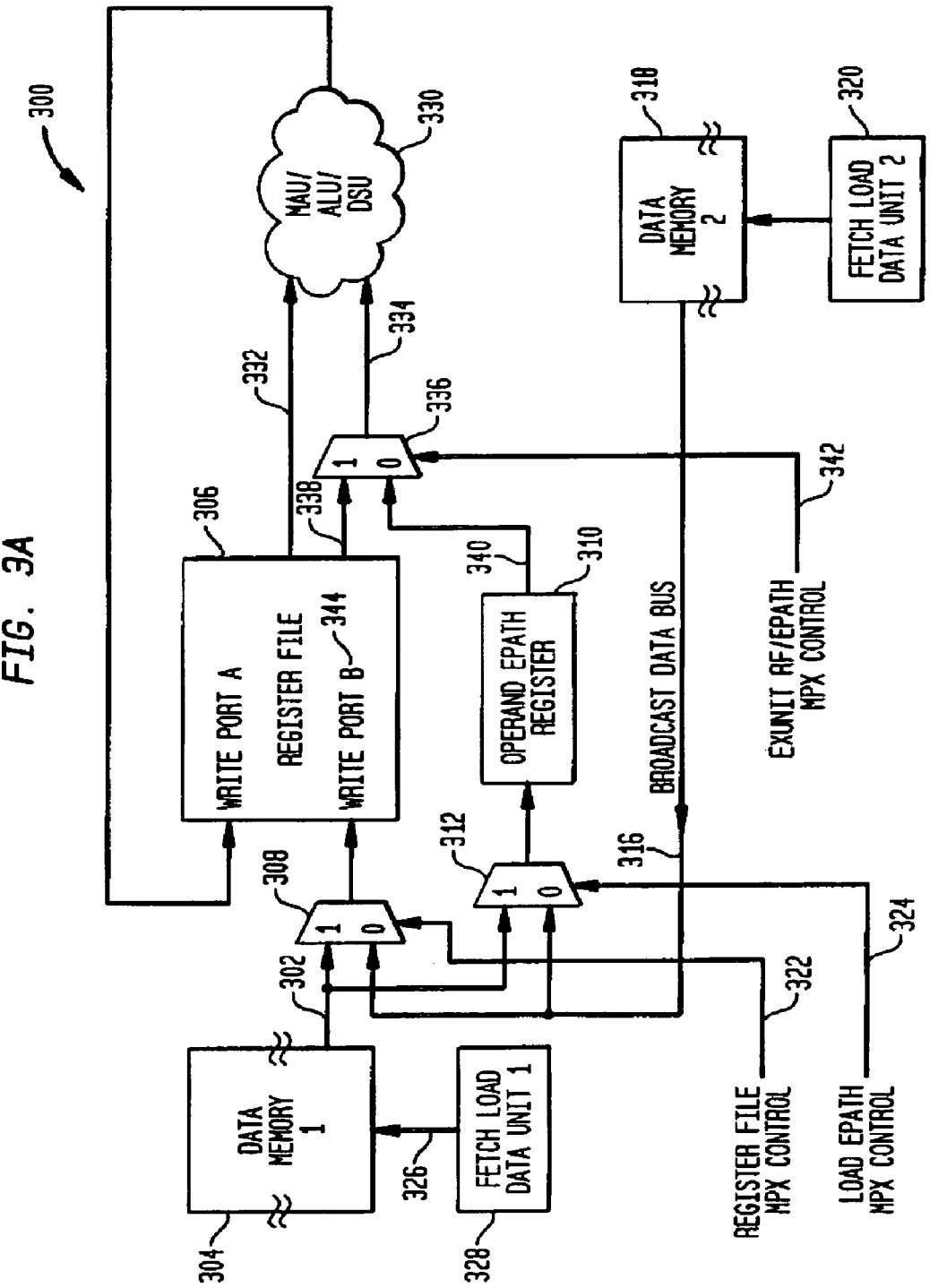
FIG. 3A illustrates a load operand extra path (Epath) circuit in accordance with the present invention.

A high level load operand Epath circuit 300 illustrated in FIG. 3A provides a memory data path 302 from data memory-1 304 to a register file 306 through multiplexer 308 and a memory data path 302 from data memory-1 304 to an operand Epath register 310 through multiplexer 312. The multiplexers 308 and 312 also provide a selectable path from the broadcast data bus 316 to the register file 306 and the operand Epath register 310. The broadcast data bus 316 is sourced from a data memory-2 318 under addressing and control of fetch load data unit 2 320. To load data from data memory-1 304 to the register file 306, the register file mpx control signal 322 is set to 1. To load data from the broadcast data bus 316 to the register file 306, discussed in further detail below, the register file mpx control signal 322 is set to 0. To load data from data memory-1 304 to the operand Epath register 310, the load Epath mpx control signal 324 is set to 1. To load data from the broadcast data bus 316 to the operand Epath register 310, the load Epath mpx control signal 324 is set to 0. A load instruction provides the information to generate the effective address 326 of the data to be loaded from the data memory-1 304 in the fetch load data unit-1 328.

The execution units, such as an ALU, MAU, and DSU, 330 can use operands from the register file 306 and the operand Epath register 310 with selective control of multiplexer 336. For example, two operand paths to the execution units 330 are shown in FIG. 3A. A direct register file path 332 and a multiplexed path 334 through multiplexer 336 for selection of a register file output 338 or the operand Epath register output 340. The multiplexer 336 is controlled by an exunit register file Epath mpx control signal 342 which causes multiplexer 336 to select register file output 332 if the control signal 342 is a 1, and to select the operand Epath register output 340 if the control signal 342 is a 0.

The advantages of the Epath circuit 300 can be further explained by describing the execution sequence of two VLIW instructions that can take advantage of the Epath circuit. Two VLIW instructions, each following pipeline 185, are illustrated in further detail in pipeline sequence 350 in which the pipeline stages show operational details pertinent to the use of the Epath register 310. To provide Epath accessing information, an execute VLIW (XV) instruction is expanded with appropriate Epath control information. Each execute VLIW expanded (XVX) instruction supports the load operand Epath mechanism while still using the basic VIM loading hardware, with minimum changes required to the VIM control logic and VLIW data flows. The basic VIM loading mechanism is described in further detail in U.S. Pat. No. 6,748,517, columns 167-190, for example. Also, the apparatus and techniques for use of an Epath register by store instructions is described further below.

By way of example, assume there are two XVX instructions in sequence named $XVX_1$ and $XVX_2$ as follows. The VLIW associated with $XVX_1$ has at least a load instruction in its enabled VLIW slot, for example, a load direct (LD.p.w), where the (.p) indicates this instruction is a PE instruction and the (.w) indicates that a word data type is to be loaded. The VLIW associated with $XVX_2$ has at least an arithmetic instruction (MAU, ALU, or DSU) 334, such as an add (ADD.p.w) instruction, for example.

The execution of the two instruction sequence begins with the I-Fetch unit 109 of FIG. 1 fetching the $XVX_1$ SIW from program memory 111 and distributing the $XVX_1$ instruction to the SP and PEs in Ifetch $XVX_1$ stage 352. The fetched $XVX_1$ instruction is predecoded in stage 354 causing the VLIW associated with the $XVX_1$ instruction to be fetched from VIM. Each VLIW slot is decoded in stage 356, which focuses on the decode of the LD.p.w slot instruction. As initiated by the $XVX_1$ instruction, the LD.p.w instruction causes data to be fetched on memory data bus 302 from data memory-1 304 at the LD.p.w memory address generated in the fetch load data unit-1 328 during the execute1 cycle 358. The $XVX_1$ instruction further contains control information that can be set to specify the fetched data is to be written to the operand Epath register (OER) 310 or a register in the register file 306 using write port B 344.

Multiplexers 308 and 312 are used to select the data path. Multiplexer 312 is controlled through a decode of the $XVX_1$ instruction causing the load Epath mpx control signal 324 to be generated in an active or inactive state with appropriate timing with respect to the pipeline. When the load Epath mpx control signal 324 is active, the memory data path 302 is selected for loading memory data to the operand Epath register 310. Similarly, multiplexer 308 is controlled through a decode of the $XVX_1$ instruction causing the register file mpx control signal 322 to be generated in an active or inactive state with appropriate timing with respect to the pipeline. When the register file mpx control signal 322 is active, the memory data path 302 is selected for loading data memory-1 data to the register file 306. The architecture definition specifies the selection paths of the multiplexers 308 and 312 and encodes the specification in the $XVX_1$ instruction.

Figure 3B:
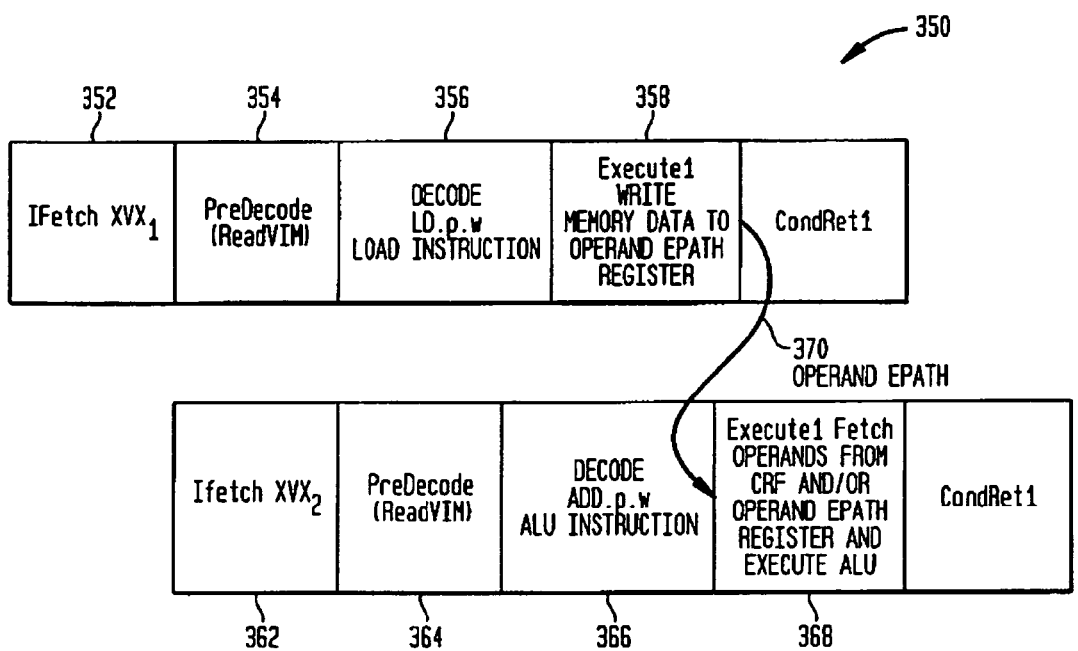
FIG. 3B illustrates a sequence of two iVLIW pipelines with expanded operational detail for purposes of illustrating a load Epath operation in accordance with the present invention.

The XVX₂ instruction follows the XVX₁ instruction, and, in a manner similar to the XVX₁ instruction, the XVX₂ instruction is fetched and distributed to the SP and PEs in ifetch stage 362. The fetched XVX₂ instruction is predecoded in stage 364 causing the VLIW associated with the XVX₂ instruction to be fetched from VIM. Each VLIW slot is decoded in stage 366, which focuses on the decode of the ADD.p.w slot instruction. As initiated by the XVX₂ instruction, the execution of the ADD.p.w instruction in execute1 stage 368 causes the ALU to receive a source operand from the OER 310, as selected by multiplexer 336, instead of from the register file. As illustrated by the highlighted path 370 in FIG. 3B, the memory data loaded by the LD.p.w instruction in the OER 310 in stage 358 is accessed from the OER 310 by the ADD.p.w instruction.

The multiplexer 336 is controlled through a decode of the XVX₂ instruction in decode stage 366 providing controls signals during the execute1 stage 368 causing the exunit rf/Epath mpx control signal 342 to be generated in an active or inactive state. When the exunit rf/Epath mpx control signal is in an inactive state, the operand Epath register 310 output data path 340 is selected to provide at least one of the operands via multiplexer 336 output 334 to the selected execution unit 330. The other operand or operands in this example would be sourced from the register file 306. The architecture definition specifies the selection path of multiplexer 336 and encodes the specification in the XVX₂ instruction. The operand Epath register 310, the register file 306, and all associated data paths may be, for example, 32-bits, 64-bits, 128-bits, or the like, depending upon the supported data types for a given implementation.

In accordance with the present invention, there are several different implementations of the OER that could be used in a processor. For example, it could be specified that the OER would only be updated when a load instruction exists in an XVX addressed VLIW instruction. Such an approach to using the OER would allow a programmer or compiler to use the results stored in the OER at a point later in the instruction stream as needed by another XVX instruction. Using the OER as temporary storage, allows the OER to be used in pipelining XVXs one after another and can maintain the value stored in the OER for use at any arbitrary point in a program instruction sequence.

The 2×2 iVLIW processor 100 of FIG. 1, without using an operand Epath register (OER), supports only a single load operation, per VLIW execution stage, of up to 64-bits in data width to the local CRFs in the SP and each PE. In order to double the load memory bandwidth, two load operations or double data width load operations need to be specified. In order to accomplish such load doubling operations without requiring changes to the compute register file, one of the dedicated store, load, MAU, ALU, and DSU instruction slots is modified to support dual load operations. For example, by allowing the store slot to be used for either load or store operations, by appropriate changes in the VIM loading mechanism and expanding the store unit decode and function logic, it becomes possible to double the load memory bandwidth available for functional operations. In addition, if certain restrictions are applied, minimal changes would be required to achieve this doubling of the memory load bandwidth.

For example, by appropriately specifying an instruction set architecture, the existing load slot can be defined to support load operations to either the CRF and/or the operand Epath register (OER). With further specifications in the architecture, the existing store slot can be defined to support both store instructions and load broadcast instructions. In other words, the store instruction slot becomes a combined store/load broadcast slot. With these specifications on how the load and store slots are used, simultaneous 64-bit load broadcast operations and 64-bit local memory loads are possible, effectively doubling the memory bandwidth with minimal changes to an existing memory data flow and no changes required to the compute register file.

A high level view of this approach is shown in FIG. 3A, where load broadcast data bus 316 can be enabled through multiplexer 312, by load Epath mpx control signal 324 being in an inactive state, to load the operand Epath register 310 from the broadcast data bus 316. Concurrently, the memory data bus 302 is selected through multiplexer 308, by register file mpx control signal 322 being in an active state, to load the register file 306 from the memory data bus 302. This concurrent dual load operation is specified by decoding an XVX selected VLIW containing a load instruction in the load slot and a load broadcast instruction in the store/load broadcast slot. The load broadcast instruction causes a memory operand of up to D-bits, where D can be equal to 16, 32, 64, 128, or the like, bits, to be accessed from the data memory-2 318, such as SP data memory 153 of FIG. 1. This accessed operand is then distributed it to all PEs over the broadcast data bus 316, such as broadcast data bus 157 of FIG. 1, making the concurrent loading scalable to an array of PEs. For example, in the 2×2 iVLIW processor 100, the load broadcast bus 157, the local data memories, and register file can be specified to use a data width of D=64-bits and dual independent 64-bit loads can then be obtained through VLIW execution. If a load operand to the Epath register is not desired, then VLIWs with single load operations can be specified.

Figure 4:
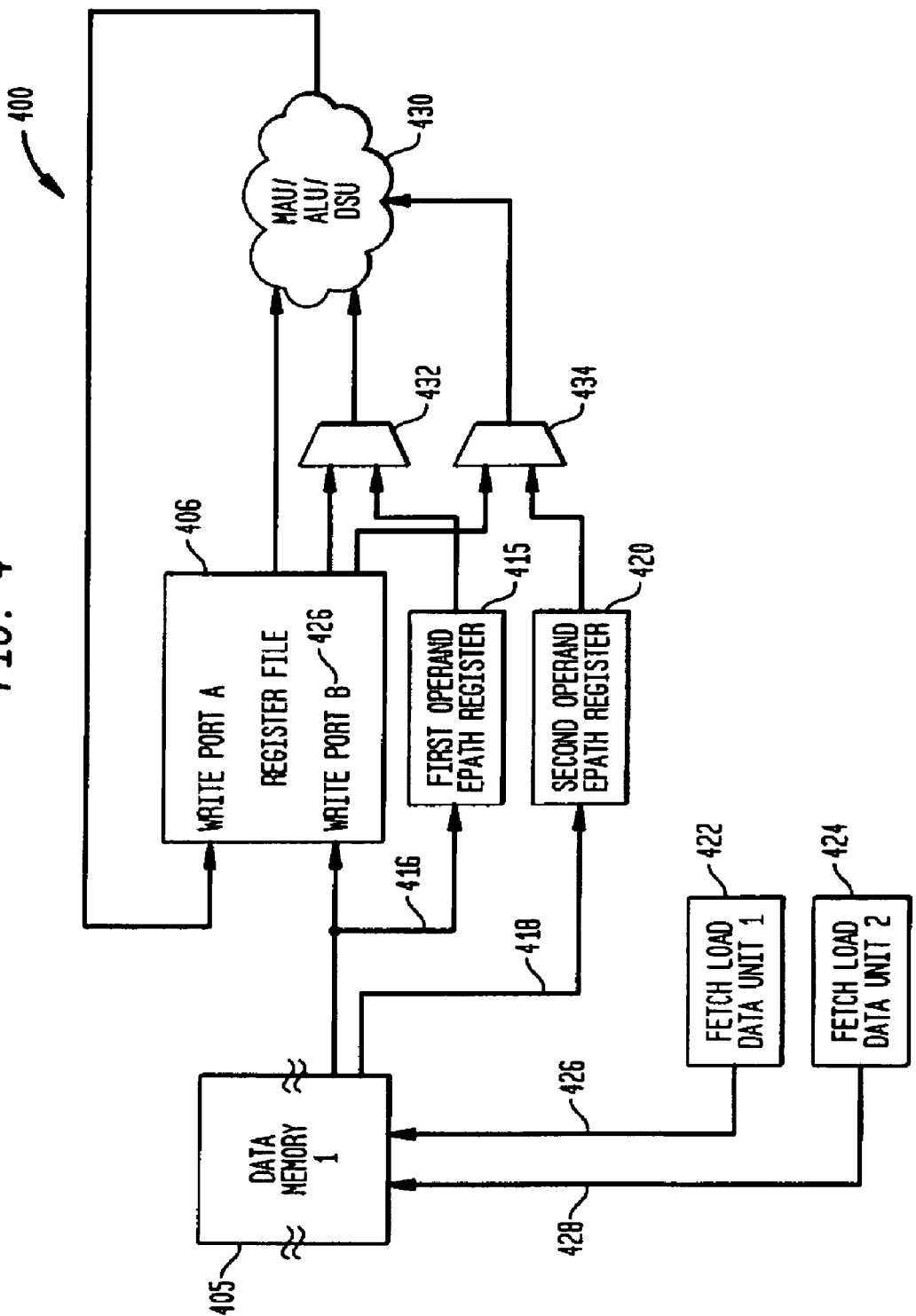
FIG. 4 illustrates a dual local memory load Epath operand circuit in accordance with the present invention.

The Epath register file approach of FIG. 3A can be expanded, and the restriction to sharing only load broadcast instructions in the store instruction VLIW slot can be removed by another approach illustrated in FIG. 4 described below. FIG. 4 shows a high level view of a dual local memory load operand Epath circuit 400. Data memory 405 in circuit 400 is organized internally with multiple banks of memory modules. By making the multiple banks of memory modules addressable by two independent 64-bit local memory load instructions with two independent 64-bit memory buses, dual 64-bit load operations may be accomplished. The addressability requirements of this memory are established by the instruction set architecture. For example, to access two independent 64-bit memory locations on 32-bit word boundaries, with no accessing overlap, four 32-bit wide memory modules, for example, could be utilized in memory 405. The no accessing overlap restriction specifies that two memory addresses generated, during the execution of two load instructions, cannot both be within an address range of the same memory module.

To establish two independent load operations within the VLIW architecture, it can be specified that any load instruction can be shared in the VLIW store instruction slot. A restriction would apply for the cases where the combined total data width exceeds the implemented capabilities of the CRF. For example, in a processor, such as the processor 100 of FIG. 1, with a CRF implementation of 64-bit maximum data load width, only one dedicated write port for load operations, and with a VLIW containing two 64-bit load instructions, both 64-bit load instructions could not simultaneously load data into the CRF. To resolve such a situation, a load operand Epath register is used where one 64-bit load instruction would write to the CRF 406 while the other 64-bit load instruction would write to a 64-bit Epath register, such as a first operand Epath register 415 shown in FIG. 4.

In addition, the data memory 405 and memory interface utilize two independent memory data buses, such as memory buses 416 and 418, to support the two 64-bit load instructions. It is anticipated that the data memory 405 would contain appropriate multiplexing to select which memory banks provide the data to load the register file and the Epath register. With two load instructions in a VLIW, two operand Epath registers, such as first operand Epath register 415 and a second operand Epath register 420, could be loaded in parallel. With two load instructions in a VLIW, two fetch load data units 422 and 424 would provide the addressing to data memory 405 through addressing paths 426 and 428, respectively. The data path to selected execution units 430 contains multiplexers 432 and 434 to select either a register file output or an operand Epath register output. The multiplexers 432 and 434 are controlled by decoding instructions that specify the required operand sources. Though not shown in FIG. 4, it is anticipated that a load broadcast instruction could be specified as one of the two load instructions and a load broadcast bus could be provided and multiplexed with the memory data buses 416 and 418. In operation, if loading an operand to an Epath register is not desired, then single load operations can be specified.

Figure 5:
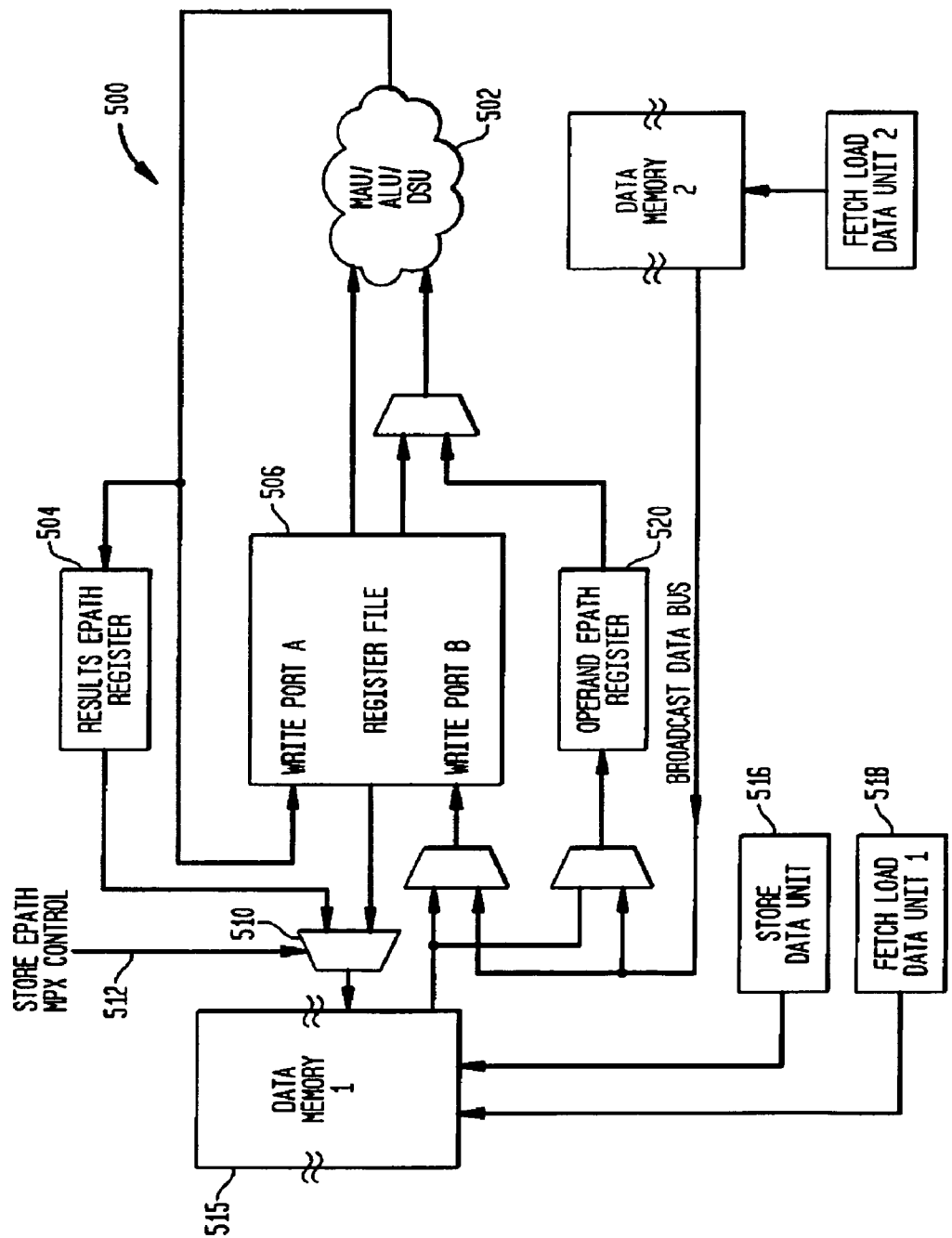
FIG. 5 illustrates a load and store Epath operand circuit in accordance with the present invention.

FIG. 5 illustrates a complementary load and store operand Epath circuit 500 that allows results from an arithmetic unit 502 to be written to a results Epath register (RBR) 504 or a register in a register file, such as register file 506. A store operation embedded in a VLIW addressed by an XVX type instruction would then write the data from the RBR 504 as selected by multiplexer 510, instead of from the register file 506, to data memory-1 515. The multiplexer 510 is controlled by a store Epath mpx control signal 512 that is generated from a decode of the XVX instruction with appropriate timing with respect to the pipeline. The data memory-1 515 store address is generated by a store address generation unit 516. In a similar manner, a load address is generated by a load address generation unit 518 and operand Epath register 520 can be used to receive memory data accessed by a load instruction.

Combinations of loads and stores using the operand Epath and results Epath mechanisms in conjunction with arithmetic instructions in indirect VLIW instructions can be advantageously used to alleviate potential bottlenecks of having limited register file capacity. In addition, the load and store operand Epath circuits may also be used as a possible power saving technique since the number of register file accesses could be reduced and spill-to-memory problems, due to insufficient register file capacity, could also be reduced.

Figure 6:
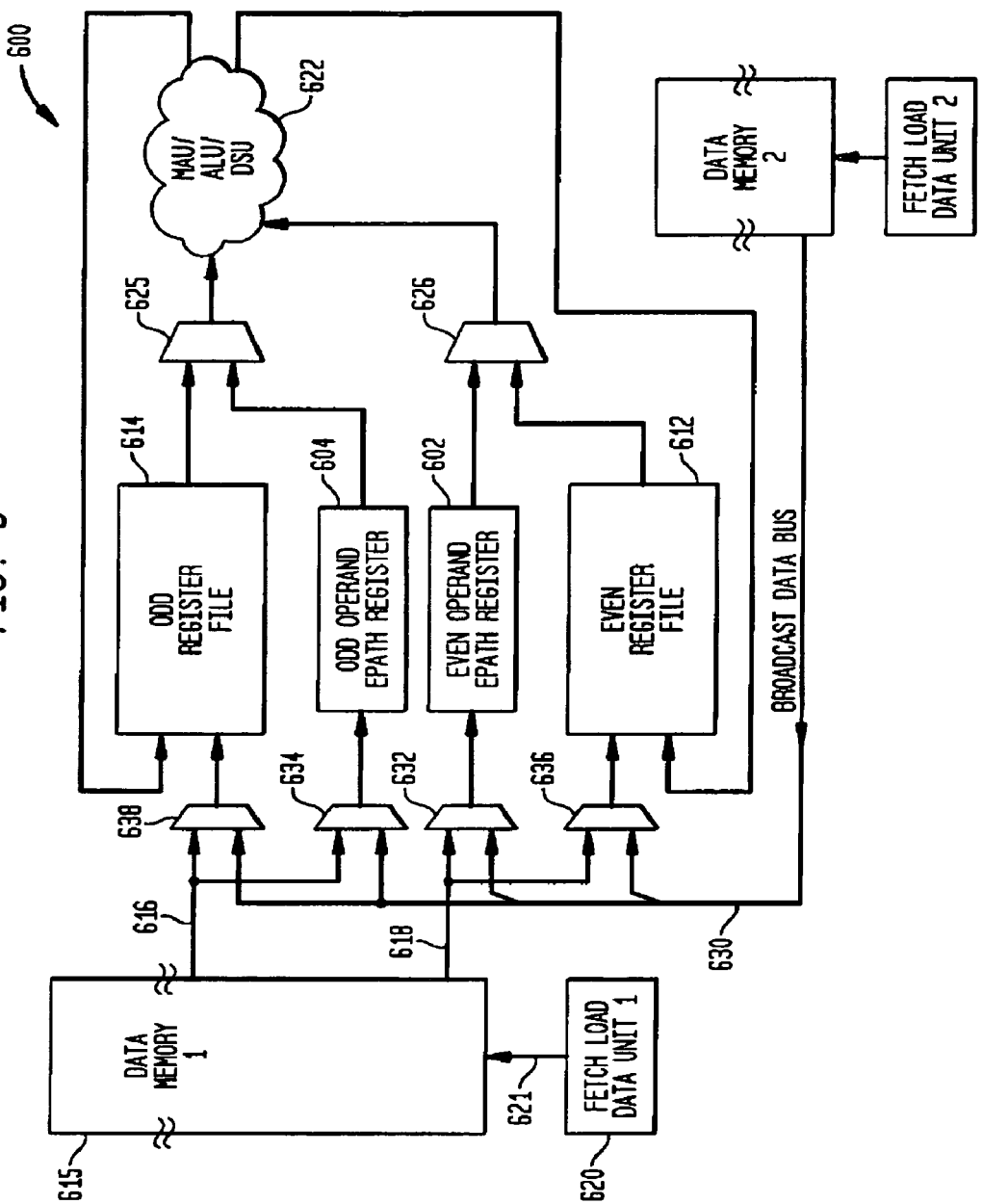
FIG. 6 illustrates an odd/even load Epath operand circuit in accordance with the present invention.

The 2×2 iVLIW processor 100 shown in FIG. 1 uses a common design compute register file configured in an odd/even register organization. An odd/even load operand Epath circuit 600 is illustrated in FIG. 6 for the purposes of providing a high level view of how load operand Epath registers can be used in an odd/even register organization. Specifically, the operand Epath register is split into an even operand Epath register 602 and an odd operand Epath register 604 associated with the even register file 612 and odd register file 614, respectively. For load operations, the appropriate operand Epath register and the appropriate register file are loaded depending upon information decoded from the execution of instructions supporting dual load operations, such as an XVX with two load instructions in the selected VLIW.

The specific mechanism to control the loading of the even and odd operand Epath registers can be implemented in several different ways. For example, a configuration bit or set of configuration bits, included in the XVX instruction, as discussed in further detail below in connection with the discussion of the XVX instruction 700 of FIG. 7, could be used to specify the data loading operations. The XVX instruction provides the control bit information to be evaluated during decode of the load instructions contained in the XVX accessed VLIW. The load operations thereby modified by XVX control information cause data from data memory-1 615 to be loaded into an even operand Epath register (EOER) 602 and an odd operand Epath register (OOER) 604. Both odd register file 614 and even register file 612, such as SPCRF 135 and PECRFs 136-139, for example, of the 2×2 iVLIW processor 100 shown in FIG. 1, support 32-bit wide data. Consequently, the two memory data buses, 616 and 618, are both specified as 32-bit wide buses. As an example, a 0.2 w dual 32-bit load instruction causes the fetch load data unit-1 620 to generate a single address 621 to data memory-1 615. The 0.2 w dual 32-bit load instruction further causes two 32-bit memory data values to be fetched on buses 616 and 618 as selected by the bus 621 supplied address location and the memory data is loaded to the register file or Epath registers as specified in the XVX instruction.

To provide dual 64-bit loading capability, for example, a 64-bit load broadcast data path 630 is controlled by multiplexers 632 and 634 to enable the loading of the low order 32-bits and the high order 32-bits of the 64-bit data path to the even and odd Epath registers 602 and 604, respectively. Concurrently, a memory data path can be enabled through multiplexers 636 and 638 to load the even and odd register files 612 and 614, respectively, from data memory-1 615.

Source operands for the execution units 622 are selected, based upon instruction decode information, from the register file 612 or Epath register 602 by multiplexer 626 and from the register file 614 or Epath register 604 by multiplexer 625.

The XVX instruction 700 of FIG. 7A and the operation/syntax table 740 of FIG. 7B specify how the XVX instruction 700 may be used to initiate an indirect VLIW (iVLIW) to execute with selectable control over load path and store path use of the Epath registers. The iVLIWs that are to be selected for execution by an XVX instruction are stored at individual addresses of the specified SP or PE VLIW Memory (VIM). The VIM address is computed as the sum of a base VIM address register, V0 or V1, as selected by Vb 712, plus an unsigned 8-bit offset VIMOFFS 714. The VIM address must be in the valid range for the hardware configuration otherwise the operation of this instruction is undefined. Any combination of individual instruction slots may be executed via the execute slot parameter 'E={SLAMD}' 716, where S=store unit (SU), L=load unit (LU), A=arithmetic logic unit (ALU), M=multiply-accumulate unit (MAU), D=data select unit (DSU). A blank 'E=' parameter does not execute any slots. The unit affecting flags (UAF) 718 parameter 'F=[AMDN]' overrides the UAF specified for a VLIW when it was loaded via the load VLIW (LV) instruction. The override selects which arithmetic instruction slot (A=ALU, M=MAU, D=DSU) or (N=not A, M, or D) is allowed to set condition flags for this execution of the VLIW. The override does not affect the UAF setting specified via the LV instruction. A blank 'F=' selects the UAF specified when the VLIW was loaded. FIG. 8 shows a flow control opcode (CtrlOp) 720 assignment table 800 with the opcode 810 used to encode the new XVX instruction highlighted in bold font.

In support of memory operand functions on the 2×2 iVLIW processor 100, the store VLIW slot can hold either a store instruction or a load broadcast instruction but, as defined, only one load broadcast instruction is allowed at a time in any VLIW, since there is only one broadcast bus 157. All local-memory load instructions are to be placed in the dedicated load VLIW slot. If a dual load capability is desired, a load broadcast instruction and a load instruction are placed in the LV instruction load sequence with the hardware determining the correct placement of the instructions into the appropriate VLIW slots through a decode function. In operation with a local-memory load and a load broadcast instruction in an XVX selected VLIW, the local-memory load instruction as defined by the architecture in this exemplary system, uses the Epath register and the load broadcast instruction uses the register file, since there is only one dedicated load port into the register file. In an alternative implementation, the choice of which load instruction, a local-memory load instruction or a load broadcast load instruction, has access to the Epath register can be switched from that defined here and even made selectable by use of an additional bit in the XVX instruction plus some additional multiplexing.

The XVX instruction 700 of FIG. 7A as specified in the syntax/operation table 740 of FIG. 7B provides support for one load operand Epath 64-bit register and one store results Epath 64-bit register. The XVX instruction 700 format uses parameters encoded as bit fields in the instruction to control the dual load operation. A load Epath (LE) parameter 722 specifies whether the CRF (LE=0) or the operand Epath register (LE=1) is the target of the load memory instruction in the dedicated Load. VLIW slot. By architectural definition, if a load instruction and a load broadcast instruction are in a VLIW, then the load instruction must write to the operand Epath register (LE=1) while the load broadcast instruction writes to the CRF. The store Epath (SE) parameter 724 specifies either the CRF (SE=0) or the results Epath register (SE=1) as the data source for a store instruction in the store VLIW slot. The execute Epath (XE) parameter 726 specifies either the CRF (XE=0) or the results Epath register (XE=1) as the target of a Csel 728 selected execution unit. The parameter Csel 728 selects which execution unit is to use the Epath registers, (Csel 00=ALU, 01=MAU, 10=DSU, and 11=Reserved). A parameter Epsel 730 indicates which operand or operands are read from the operand Epath register or registers. For a selected execution unit, the four values of Epsel are interpreted as follows: 00=read operands from the CRF, 01=read the Rx operand from the Epath register and other operands from the CRF, 10=read the Ry operand from the Epath register and other operands from the CRF, and 11=read both Rx and Ry operands from two Epath registers and in the case of the MAU the Rt operand is from the CRF. In alternative implementations, the MAU Rt operand could be sourced from the results Epath register with selective control provided in additional parameter bits or encodings.

In a typical or default configuration, a double word data type that is selected from local memory and is destined to be loaded in an OER will have its least significant bytes loaded into the even OER and the most significant bytes loaded into the odd OER. Control over how data is loaded is, in part, specified through parameter K 732. When K=0, word, halfword, and byte data types will be zero padded and loaded into both of the OERs.

However, in a different mode of operation, K=1, a single word (or halfword or byte) could be loaded into only the EOER or the OOER. The compiler/programmer can specify which OER gets loaded by the choice of the target register in the load instruction. For example, if the Rt address field is odd, the memory transfer would be loaded into the OOER. Likewise, if the Rt address field is an even address, the memory transfer would be loaded into the EOER. This gives the compiler/programmer the flexibility to use both OERs so that they can be loaded with unique data.

With yet another parameter bit (not shown in FIG. 7A) in an XVX instruction, the option of packing data for load data types that are less than a word could be offered. This allows the programmer to load bytes or halfwords to the next available byte or halfword in the OER so that the packing would not need to be done using registers in the register file and the execution units, particularly the DSU, could be used to perform some other useful instruction. To obtain an extra bit to be utilized as the additional parameter bit, the VimOffs field 714 could be reduced, as defined by the instruction, from an 8-bit field to a 7-bit field, thereby providing the additional bit.

Note that within the XVX instruction 700 as defined in FIG. 7, the "11" value of the XVX's Epsel field 730 allows the selected execution unit to use OERs for both the Rx and Ry operands. The choice of EOER or OOER could be selected from the least significant bit of the respective operand address fields in the MAU, ALU, or DSU instruction.

When the Epath registers are used by means of an XVX instruction, the load data would not be directly stored in the CRF, since the data is being written to the Epath register. If it was desired to have dual 64-bit loads to the CRF, the data from the Epath register can be funneled through an execution unit, without modification to the CRF, by special programming. For example, an ALU ADD instruction taking one operand from the Epath register could add it to zero and return the result to the CRF in a single cycle. With software pipelining, you would get the effect of dual 64-bit loads to the CRF.

The operand Epath discussion, with regards to FIGS. 3A, 4, 5, and 6, concerned itself with the compute register file. It is noted that Epath registers are equally applicable to the other separate register files in the processor, such as the address register files (ARFs) 124, 126, 128, 130, and 132 of FIG. 1. Also, with Epath registers, such as Epath registers 602 and 604, and the XVX instruction 700, the execution unit, specified by the Csel field 728, would not use the Rx operand address field or Ry operand address field provided in the execution unit's instruction format since the data is provided by the operand Epath register as specified by the XVX instruction.

Figure 9:
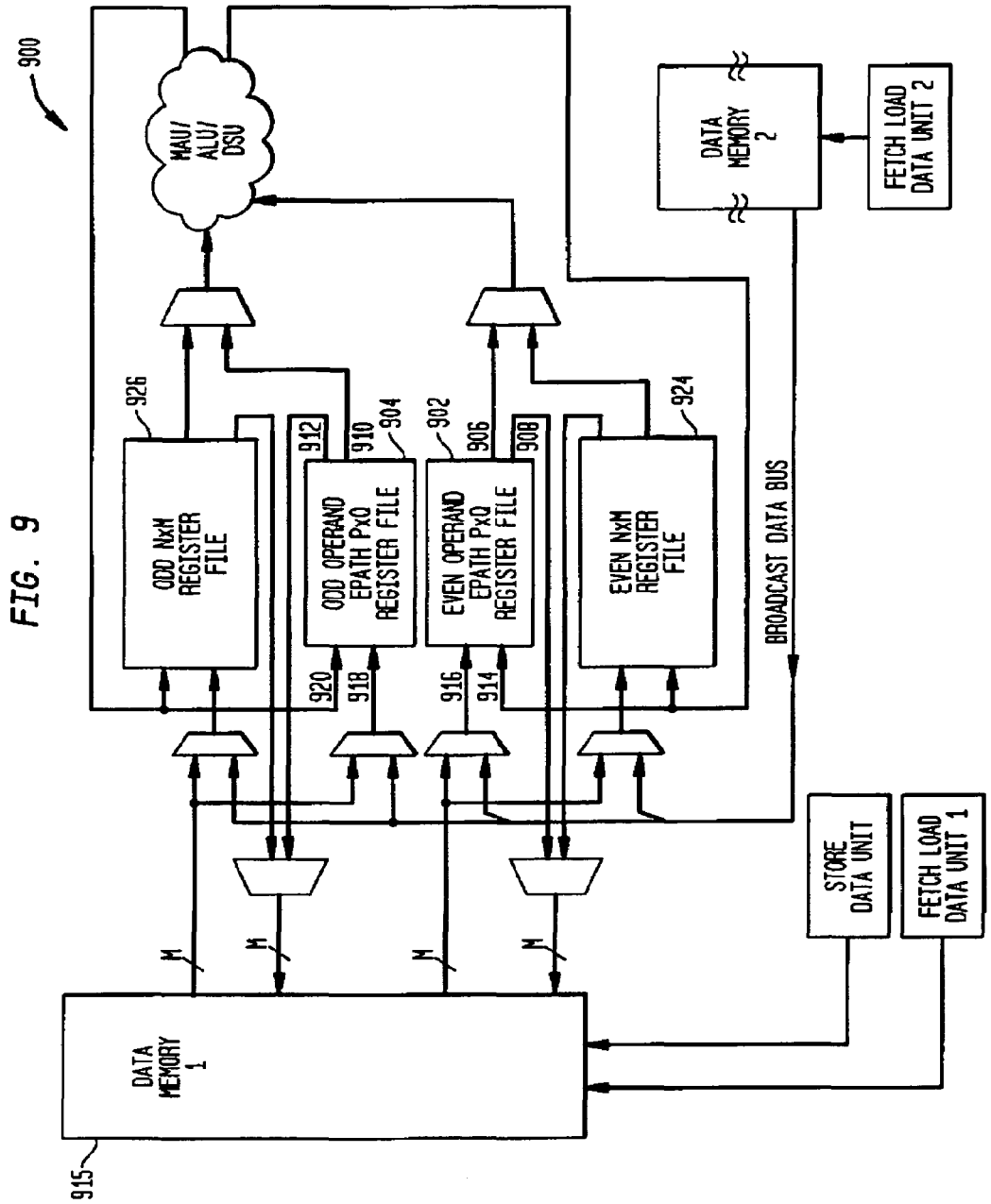
FIG. 9 illustrates an odd/even load/store Epath operand register file circuit in accordance with the present invention.

The odd and even Epath registers 602 and 604 of FIG. 6 can be extended as odd and even Epath register files 902 and 904 as shown in odd/even load/store operand Epath register file circuit 900 of FIG. 9. The Epath register files 902 and 904 accommodate both the store and load instruction use of the Epath register files, for example, by using two read ports 906, 908, 910, and 912 and two write ports 914, 916, 918, and 920 in each Epath register file. A modification of the processor to support use of Epath register files 902 and 904 of FIG. 9 instead of the single Epath registers of FIG. 6 is to require the hardware to use the Rx, Ry, and Rt fields of a VLIW instruction as addresses to the Epath register files 902 and 904 when an Epath operation is specified. When an Epath operation is not specified, the Rx, Ry, and Rt fields address the normal register files 924 and 926.

For example, the VLIW processor, such as the 2×2 iVLIW processor 100, may be implemented with N×M odd and even register files 924 and 926 that are multiported files with N=16 and M=32. In this same VLIW processor and using XVX instructions of the format shown in FIG. 7, the P×Q Epath register files 902 and 904 could have two read and two write port files, as shown, with P=16 and Q=32. In the 2×2 iVLIW processor 100 shown in FIG. 1, each multiported register file, the odd register file 926 and the even register file 924, has eight read and four write ports. It will be recognized that the P×Q Epath register files can be extended with more read and write ports thereby providing support for more concurrent operation with the Epath register files. When an XVX instruction causes a VLIW to execute, the instruction, associated with the execution unit that is to use a Epath register file, specifies an Rx, Ry, and Rt operand address with each operand address used as specified by the XVX instruction, to select specific registers from the Epath register files or the N×M register files.

The memory operand function can be implemented in another unique way. The Epath register 310 of FIG. 3A can be defined by the architecture to be renamed to any register Ri in an architected J×K register file addressable space, such as R31 in a J×K=32×32-bit register file. For the example of a 32×32-bit file, the register file 306 could actually be implemented as a 31×32-bit file with the Epath register 310 separate from the file but accessed as R31. This renaming provides for separate read and write access independent of the 31×32 register file. In a processor using an odd register file 614 and an even register file 612, such as those shown in FIG. 6, the odd and even Epath registers 604 and 602, in this alternative renaming implementation, would have the even Epath register 602 renamed to R30 and the odd Epath register 604 renamed to R31, or R0 and R1, as another example. If the processor using the register file configuration of FIG. 6 were architecturally allowed to be configured as a 32×32-bit file for 32-bit operations and 16×64-bit file for 64-bit operations, then the odd and even Epath registers would also support both 32-bit and 64-bit Epath operations. An operand Epath register's reference name can be fixed in the hardware or made programmable as specified by a special purpose control register. If it is to be programmable, then the register file cannot be reduced in capacity as would be the case with Epath registers having fixed reference names. With programmable reference names, the operand Epath register is assigned an alias name as specified by the special purpose control register and the register in the register file of the same address is not accessible. For example, if an operand Epath register is assigned a reference name of R5, then the R5 entry in the register file would not be accessible as long as the special purpose register kept the R5 designation for the operand Epath register.

An advantage of using renamed operand Epath registers is that the renamed registers Ri, such as R0, R31, R0‖R1, or R30‖R31, are already defined in most architectures and special bits that indicate to the hardware whether an Epath register is to be used or not are not generally required. Whenever a renamed register is specified in an instruction, the Epath register is used. For example, in the indirect VLIW architecture, no special XVX instruction, such as XVX instruction 700, would be required. The store VLIW slot could still be specified to accept both a store instruction and a load broadcast type instruction. In addition, the following restriction would still typically apply that only one load broadcast instruction is allowed at a time in any VLIW, since only a single broadcast bus path is typically implemented in hardware. In this rename configuration and to minimize hardware expense, all local memory load instructions use the dedicated load VLIW slot. When a local load and a load broadcast instruction are placed in a VLIW, the local memory load instruction or the load broadcast instruction must specify a renamed operand Epath register R0, R31, R0‖R1, or R30‖R31, and the other load instruction would specify any of the other registers in the register file. This constraint avoids write conflicts that could occur when two load operations are specified in a VLIW.

It is noted that in general, more than one or two registers can be renamed or specified by a programmable alias to any registers in the register file. It is also noted that if an Epath register is renamed or has a programmed alias to already architected registers, any iVLIW or non-iVLIW instruction can make use of the Epath register or registers.

In a number of examples described above, the combined store and load slot has had a restriction that only load broadcast instructions or store instructions can use the original dedicated store VLIW slot. It is noted that this restriction generally applies only to processors with J×K-bit register files supporting K-bit load data types since two independent K-bit data paths are typically not available from the local data memories in those processors. For example, in a processor using an N×M even register file, such as even register file 924, and an N×M odd register file, such as odd register file 926, 2M-bit load data types can be supported by using both load write ports in each even and odd register files. In these processors, dual independent M-bit loads are feasible from the local data memories possibly allowing increased capability for these processors in addition to a 2M-bit load broadcast capability. Consequently, a combined store/load slot could be defined that also handles general load instructions for M-bit or less data types. With the provision of two independent 2M-bit data paths from the local memories and the use of operand Epath registers, a combined store/load slot could be defined for general load instruction use supporting 2M-bit or less data types.

Figure 10:
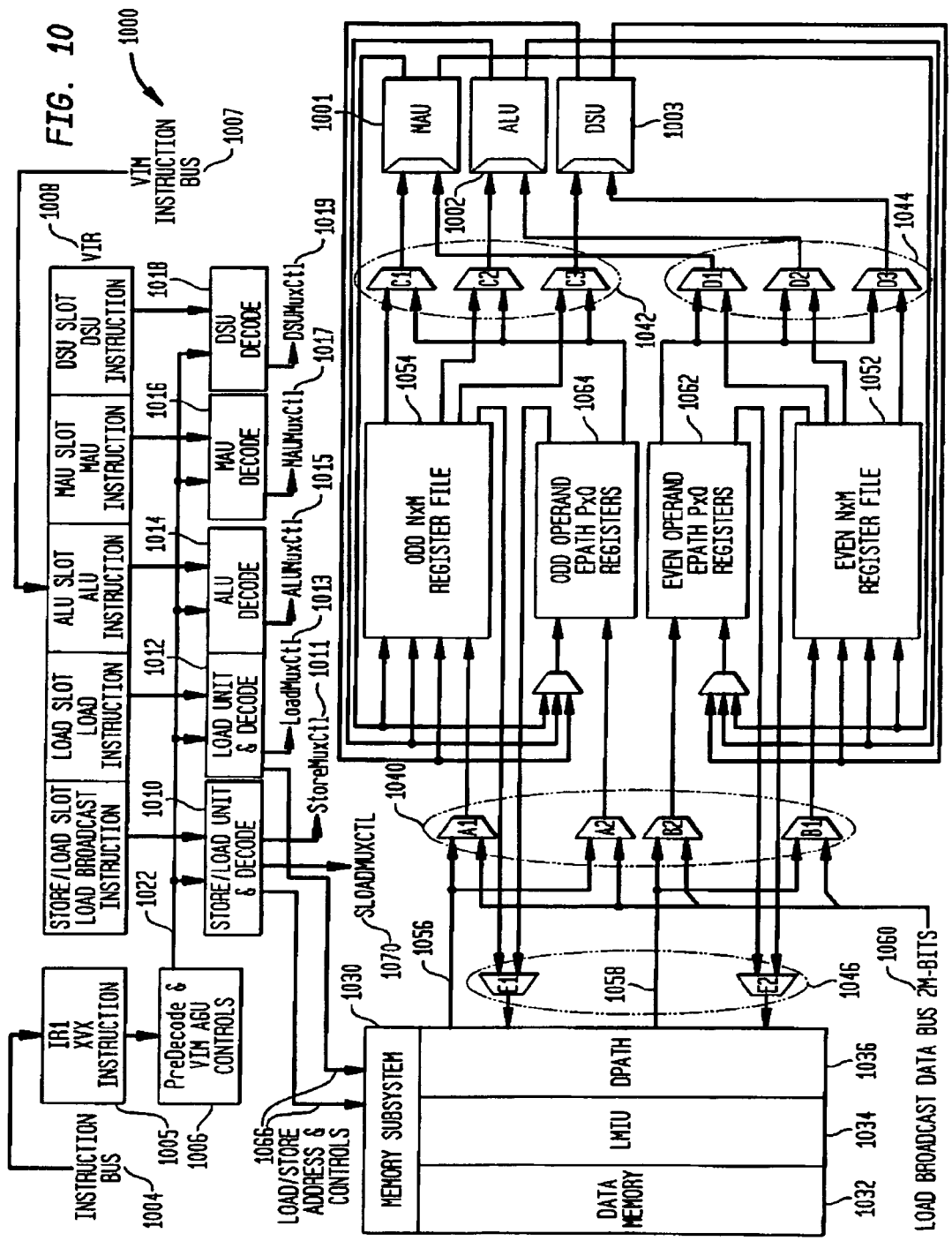
FIG. 10 shows an exemplary operand Epath data circuit for purposes of illustrating load broadcast and memory load data paths in accordance with the present invention.

FIG. 10 shows a more detailed view of an odd/even register file circuit 1000 with operand Epath register files and including three arithmetic/logical execution units MAU 1001, ALU 1002, and DSU 1003. Only a portion of the operand multiplexing and register file read and write ports needed to support all the data types an architecture may typically specify are shown in the interest of clarity of illustration. In the example shown, the register file width M is equal to the operand Epath registers' width Q. FIG. 10 also shows an instruction bus 1004, instruction register IR1 1005, VIM address generation unit (AGU) 1006, VIM instruction bus 1007, and VIM instruction register (VIR) 1008. The VIR 1008 is partitioned with slots for each instruction in a VLIW. The slots' associated instruction units: store/load unit and decode 1010, load unit and decode 1012, ALU decode 1014, MAU decode 1016, and DSU decode 1018 are also shown. A memory subsystem 1030 is shown in this exemplary implementation. Subsystem 1030 includes a data memory block 1032 that can be implemented as a single bank or as multiple banks of dual-ported random access memory (RAM). This further implementation allows concurrent DMA and processor access. A local memory interface unit (LMIU) 1034 contains data steering and multiplexers for both load and store operations. A Dpath block 1036 contains additional multiplexers and controls for such functions as sign extension. For clarity of illustration and discussion, further details, such as the DMA data path and the other execute units input data and control signals are not shown.

In operation, an XVX instruction, such as instruction 700 of FIG. 7, is received over the instruction bus 1004 into IR1 1005 and decoded in predecode and VIM AGU 1006 providing operand Epath information via signal path 1022 to the functional units' decode logic, 1010, 1012, 1014, 1016, and 1018. The XVX instruction causes an indirect access of the VIM that reads out an addressed VLIW and stores it into the VIR 1008. As shown in the exemplary circuit 1000 of FIG. 10, each of the one to five individual simplex instructions comprising the accessed VLIW is decoded to provide the proper control signals to the execution units and the data path multiplexers. A portion of the multiplexing is shown in FIG. 10 and implementation of further multiplexing will be apparent to those of ordinary skill in the art from the present disclosure and the demands of a particular architecture or application. Specifically, multiplexers 1040, 1042, 1044, and 1046 are shown. Input multiplexers 1040 A1, A2, B1, and B2 support the concurrent loading of the even and odd register files 1052 and 1054 and the even and odd operand Epath register files 1062 and 1064 by either the local memory data paths 1056 and 1058, or the load broadcast data path 1060.

As a further example, consider the following scenario for a double M-bit load operation to be carried out by using a VLIW containing a load to Rt=R31 instruction in the load VLIW slot and a load broadcast to an operand Epath register instruction in the store/load VLIW slot. For this scenario, an XVX instruction is used that specifies that if an enabled load instruction is in the VLIW load slot and an enabled load broadcast instruction is in the VLIW combined store/load slot, then the load slot instruction loads to the register files 1052, 1054 and the load broadcast instruction loads to the operand Epath register files 1062, 1064. It is anticipated that this register-file/operand Epath register load order can be switched depending upon an application's needs. In execution, the load instruction causes a memory fetch from the local data memory 1032 with the memory data being loaded to either the odd register file 1054 through multiplexer 1040 A1 or to the even register file 1052 through multiplexer 1040 B1 for M-bit loads. The least significant bit (LSB) of the Rt operand target field of the load instruction determines whether the odd or even register file is loaded. The control signals for the multiplexers 1040 are generated from decoding the XVX and slot instructions that generate the SloadMuxCtl signals 1070 and LoadMuxCtl signals 1013. The load broadcast data path 1060 is further enabled through multiplexers 1040 A2 or B2 depending upon the LSB of the Rt target field of the load broadcast instruction.

If the data type to be loaded is a 2M-bit value, then both odd and even paths through multiplexers 1040 A1 and B1 would be enabled allowing the 2M-bit data value to be loaded into both sides of the register file with M-bits per side. Similarly, a 2M-bit data value would load both operand Epath registers 1062 and 1064 through multiplexers 1040 A2 and B2. The additional multiplexing logic to support different data types is not shown, but its design and operation is apparent from the discussion above.

To operate on the data, the XVX instruction provides control bit information that is used by the execution units for selecting operands from either the register file or from the operand Epath registers. For example, multiplexers 1042 and 1044 provide data paths from the odd and even register file and operand Epath registers for both M-bit operands and 2M-bit operands to the MAU, ALU, and DSU. For example, in the MAU for the M-bit case, an operand can be selected from either the odd register file or the odd Epath registers through data path multiplexer 1042 C1. Alternately, an M-bit operand can be selected from either the even register file or the even Epath registers through data path multiplexer 1044 D1. The multiplexers C1, D1, and the MAU would generally use decoded control signals 1017 from the MAU decode logic 1016. The MAU 1001, and the other execution units would employ additional multiplexing to select, for example, between the 1042 multiplexer outputs and the 1044 multiplexer outputs. For a 2M-bit operand, both multiplexers C1 and D1 would select the appropriate data path to the execution unit and the MAU would use both output paths in its internal operation. The other multiplexers 1042 C2, C3 and 1044 D2, D3 operate in a similar manner for the ALU and DSU, respectively, using control signals, such as ALUmuxctl 1015 and MAUMuxctl 1017, generated from decoding ALU slot and DSU slot instructions, respectively, taking into account the XVX Epath information. Note that not all the multiplexing logic to support additional data types is shown in FIG. 10 for purposes of clarity of illustration. Similarly, additional read path multiplexing for designs supporting more than 2 operand Epath register file read ports is not shown.

The example XVX instruction 700 of FIG. 7 also contains bits, XE 726 and Csel 728, which specify which execution unit is to write to the CRF or to the Epath register/s. This approach requires the odd and even operand Epath register files, such as files 1062 and 1064, to be multiported allowing at least a load unit and a Csel specified execution unit to simultaneously write data to the Epath registers. An extension to the implementation and the XVX instruction would be to provide bits and the associated data path to specify multiple execution unit write paths to the operand Epath registers.

Store instructions can be controlled by the XVX instruction to store values from either of the odd/even register files or the odd/even Epath registers. The multiplexers 1046 E1 and E2 are used for the purpose of selecting between the two types of registers as generally controlled by the StoreMuxCtl signals 1011.

The XVX instruction 700 of FIG. 7 is designed for a 5-slot indirect VLIW architecture. It is recognized that by sharing the store slot with load broadcast instructions a limitation is placed on throughput for certain types of algorithms. This limitation is due to the inability to store calculated results to memory in the same cycle the dual 64-bit loads are occurring. There are a number of ways to improve the architecture to address this limitation. One way is to use double load instructions which use the single load slot in the VLIW and require no sharing of slots to effect a double 64-bit load with concurrent stores and arithmetic operations. Another way to improve the design requires a 6-slot VLIW. Both methods and example associated circuitry for such methods are described below.

FIG. 11 illustrates an exemplary set of double load instructions 1100 each of which specify two independent load operations. Each instruction specifies a first of the two operations as a data load broadcast from the SP's data memory to an Epath target register and a second operation as a data load from the PE's local memories to a CRF, ARF, or MRF target register. Opcode 1102 (111) identifies the instructions 1100 of FIG. 11 as being double load instructions consisting of a load broadcast from SP data memory and an independent load from local PE data memories. Opcodes 1102 (000-110) specify single load instructions. In addition, bit 12 1104 further specifies the type of double load instruction, either the 1106 set or the 1108 set of instructions. Since by definition these instructions define PE operations, the S/P bit 1110 can be used for other purposes. An S/P bit 1110 defines for load table instruction types where a load table operation is to occur from, with S/P=0 indicating an SP load broadcast table operation combined with a load indirect instruction operation in the PEs and S/P=1 indicating an SP load broadcast table operation combined with a load table from the PE memories. A double load instruction causes the PEs to use the instruction specified parameters for local PE address generation using the local ARFs in each PE, such as ARFs 126, 128, 130, and 132, for local PE memory loads. The double load instruction also causes the SP to use the SP ARF 124 and instruction specified parameters for SP address generation for the load broadcast operation. For example, a 3-bit An bit field 1112 specifies an address register from the ARF in both the SP for the SP load broadcast operation and in each PE for PE load operations. The value stored in the common ARF address register An may be different in the SP ARF 124 and in each of the PE's ARF making the effective address generation in the SP and in each PE unique.

A double load broadcast modulo indexed with scaled update (DLBRMX) instruction using format 1120 combines a load broadcast modulo indexed with scaled update (LBRMX) instruction with a load modulo indexed with scaled update (LMX) instruction. A double load broadcast modulo indexed with unscaled update (DLBRMXU) instruction using format 1120 combines a load broadcast modulo indexed with unscaled update (LBRMXU) instruction with a load modulo index with unscaled update (LMXU) instruction.

A double load broadcast indirect with scaled immediate update (DLBRII) instruction using format 1122 combines a load broadcast indirect with scaled immediate update (LBRII) instruction with a load indirect with scaled immediate update (LII) instruction. A double load broadcast indirect with unscaled immediate update (DLBRIUI) instruction using format 1122 combines a load broadcast indirect with unscaled immediate update (LBRIUI) instruction with a load indirect with unscaled immediate update (LIUI) instruction.

A double load broadcast indirect with scaled update (DLBRI) instruction using format 1124 combines a load broadcast indirect with scaled update (LBRI) instruction with a load indirect with scaled update (LI) instruction. A load broadcast indirect with unscaled update (DLBRIU) instruction using format 1124 combines a load broadcast indirect with unscaled update (LBRIU) instruction with a load indirect with unscaled update (LIU) instruction.

A double load broadcast from table (DLBRTBL) instruction using format 1126 combines a load broadcast from table (LBRTBL) instruction with a load indirect with scaled update (LI) instruction when the S/P-bit=0 or combines the load broadcast from table (LBRTBL) instruction with a load from table (LTBL) instruction when the S/P-bit=1.

Further details of the LBRMX, LMX, LBRMXU, LMXU, LBRII, LII, LBRIUI, LIUI, LBRI, LI, LBRIU, LIU, LBRTBL, and LTBL instructions can be found in U.S. Pat. No. 6,748,517.

When a double load instruction is issued for non-VLIW execution on the SP and the PEs, a load broadcast operation causes broadcast data to be written to the Epath registers in the PEs and a local PE memory load operation causes local PE memory data to be written to the PEs' CRFs. The selection of the Epath register and CRF for the two operations of the double load instructions can be fixed in a different order than discussed above or the selection made programmable depending upon implementation needs. The double load instruction's single Rt field specifies the Rt in the CRF and the Rt in the Epath registers, when multiple Epath registers are implemented.

Figure 12:
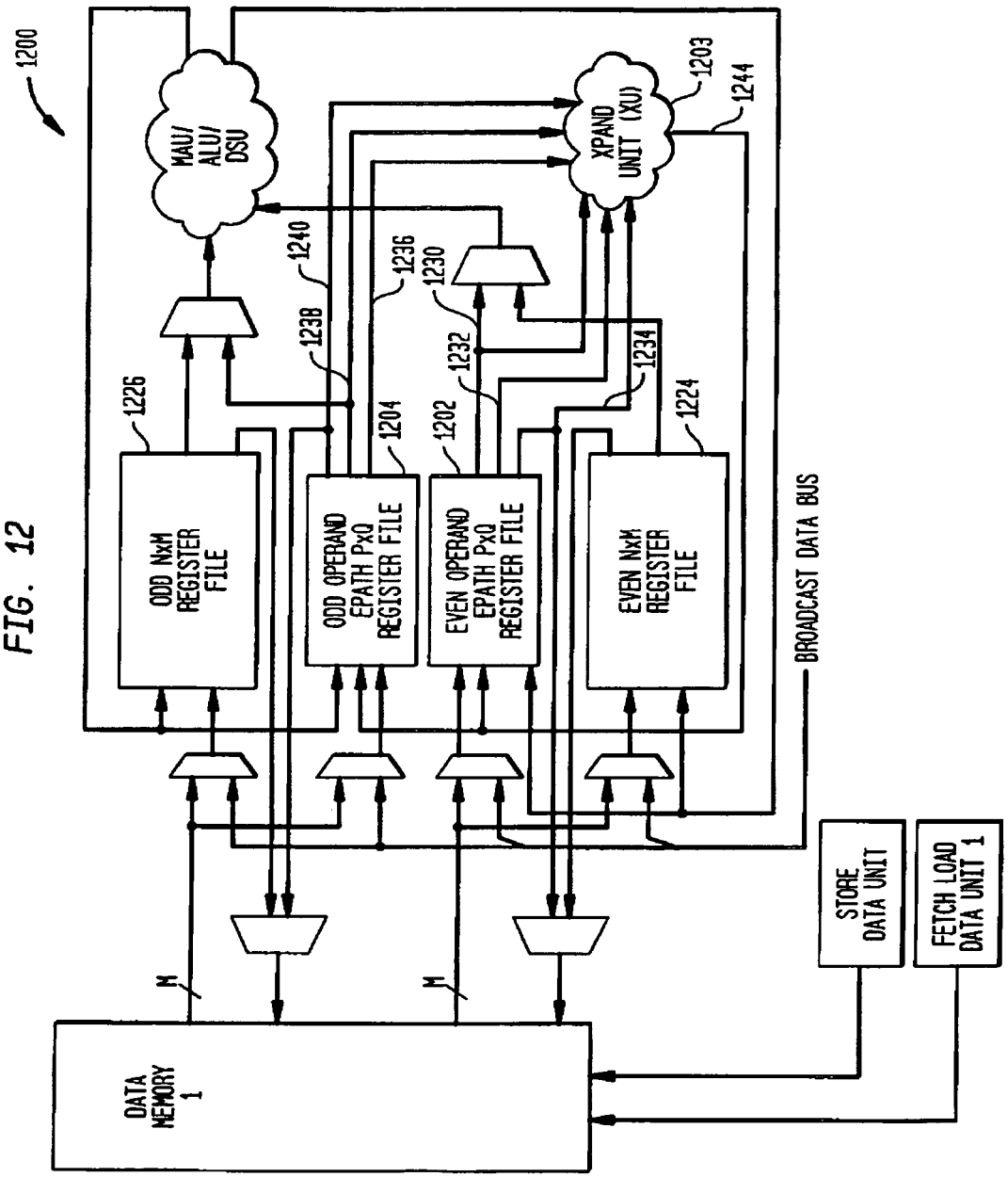
FIG. 12 illustrates an Epath and compute register file (CRF) circuit supporting an expand (Xpand) execution unit in accordance with the present invention.

In an alternative approach to obtain slot independence for double load operations, a six instruction VLIW architecture is used in conjunction with the Epath register file. The Epath register file circuit 900 of FIG. 9 is extended by adding another execution unit. FIG. 12 illustrates an Epath and CRF circuit 1200 supporting an expand (Xpand) execution unit 1203. The even N×M register file 1224 and the odd N×M register file 1226 maintain the same number of read and write ports as the even N×M register file 924 and odd N×M register file 926. Without adding additional ports to the even/odd register files 1224 and 1226, an additional read port is added to each Epath register file, as compared to the Epath register file 902 and 904 of FIG. 9, to provide a concurrent source for operands for expand unit (XU) 1203. Similarly, an additional write port is added to each Epath register file, as compared to the Epath register file 902 and 904 of FIG. 9, to provide a concurrent write destination for XU 1203 results. The Xpand unit (XU) 1203 primarily receives input source operands 1230, 1232, 1234, 1236, 1238, and 1240 from the Epath registers 1202 and 1204 and writes results 1244 to target Epath registers. The XU 1203 is the sixth execution unit in the SP and PEs of an expanded version of the 2×2 iVLIW processor 100 using a VLIW with six slots, X, S, L, A, M, D.

Figure 13A:
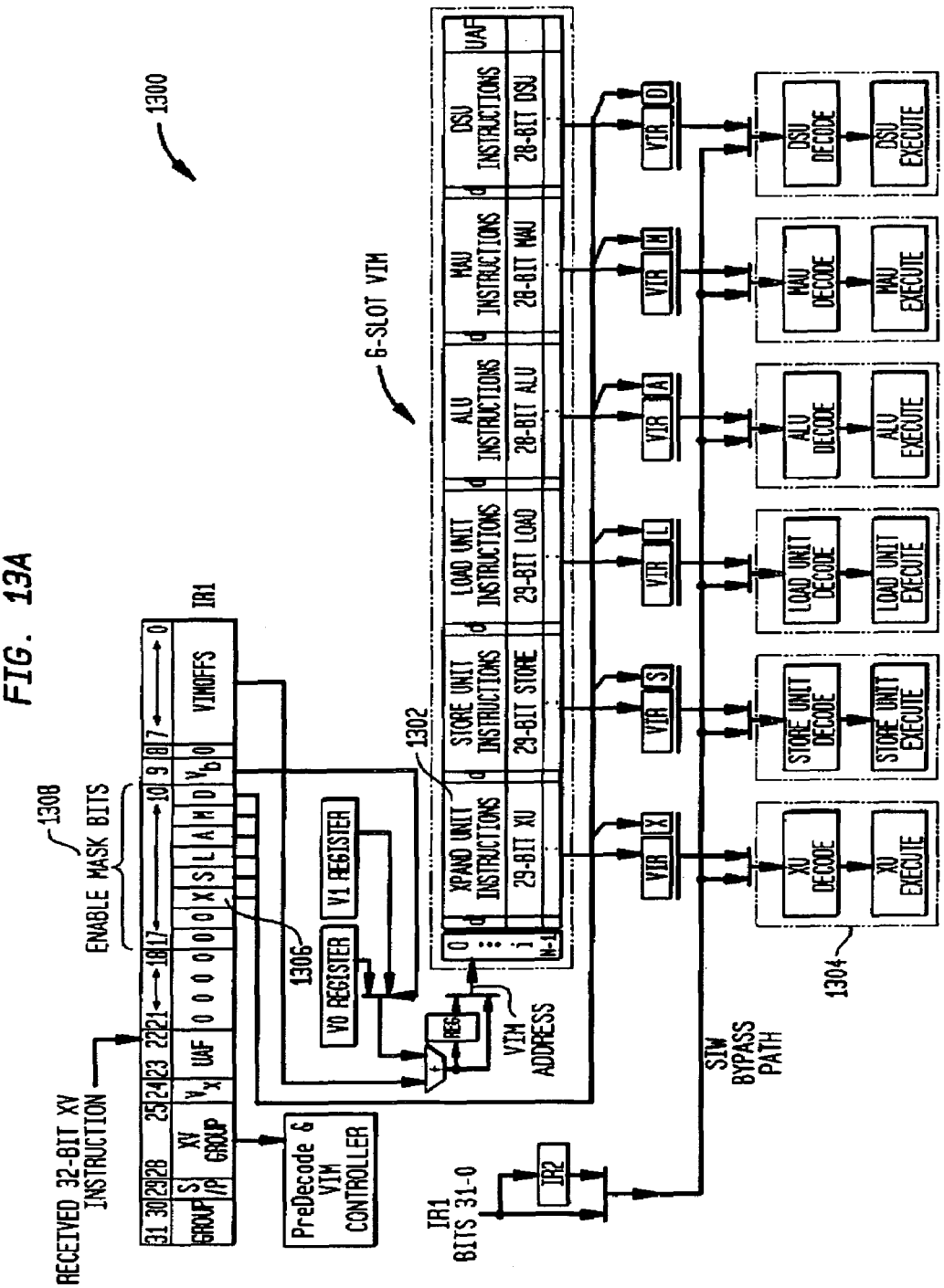
FIG. 13A is a block diagram of a six slot iVLIW apparatus with an exemplary Xpand unit and iVLIW execution flow in accordance with the present invention.
Figure 13B:
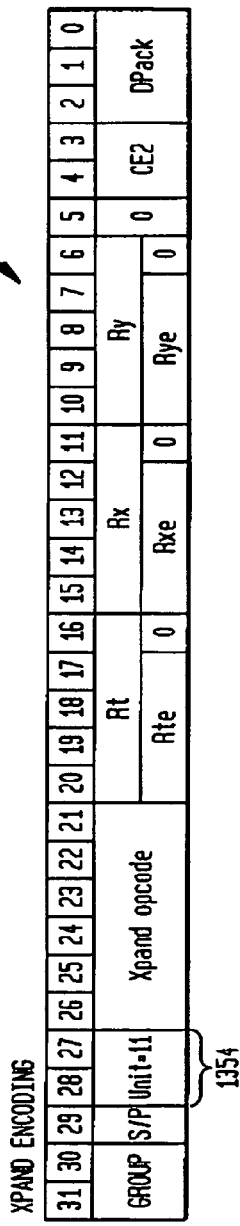
FIG. 13B illustrates an Xpand SIW encoding.

FIG. 13A illustrates a six slot iVLIW apparatus 1300 illustrating an exemplary XU and iVLIW execution flow employing an XU, such as the XU 1203, in an expanded 2×2 iVLIW processor. The VLIW instructions stored in the VIMs contain an additional slot, a sixth slot 1302 for storing XU instructions. The XU decode and execution unit 1304 is controlled by the instruction stored in sixth slot 1302 and a slot enable bit X 1306, bit 15. The X slot enable bit 1306 is included as part of enable mask bits 1308. An example of an XU instruction format 1350 is shown in FIG. 13B. Format 1350 utilizes a unit field code 1354 of 11 to identify XU instruction types. The instructions specified for the XU can be new instructions, such as new forms of Load, Store, ALU, MAU or DSU (SLAMD) instructions, different than the existing SLAMD instructions supported by the existing execution units. Alternatively, or in addition, the XU instructions may be duplicates of existing supported SLAMD instructions. The function and concurrency requirements of applications to be executed on the processor aid in determining the XU instruction definitions. The sixth slot 1302 allows operations on data held in the Epath registers to be concurrent with other Load/Store/MAU/ALU/DSU operations that use the CRF. For example, the XU unit can be designed to support the additional load requirements of the expanded processor. A load instruction in the load VLIW slot, a new load instruction in the XU slot, arithmetic instructions in their appropriate slots, and a store instruction in the store slot would support two concurrent load operations to the processor without any compromise on store instruction use.

Figure 14:
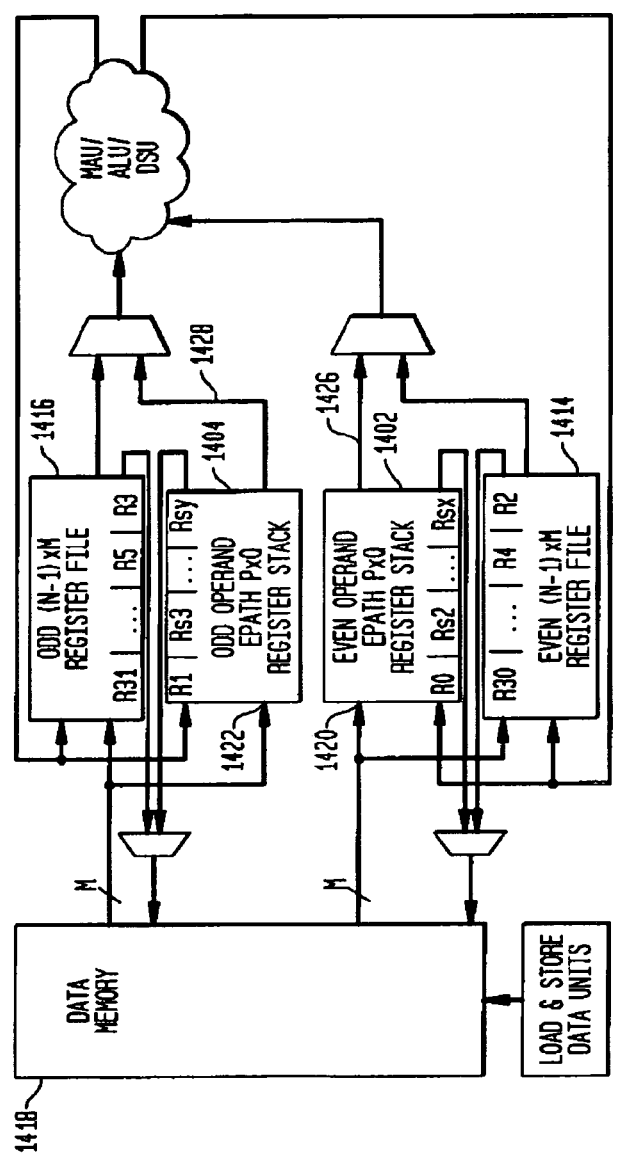
FIG. 14 illustrates an odd/even operand Epath register stack in accordance with the present invention.

An interesting extension to the approach of operand Epath registers described so far is an odd/even operand Epath register stack circuit 1400 illustrated in FIG. 14. The operand Epath register stack circuit 1400 employs two Epath register files 1402 and 1404, operable as a last-in first-out (LIFO) register stack, where two of the registers from Epath register files 1402 and 1404 are aliased to R0 and R1, to support 2M-bit loads. The other registers of the Epath register files 1402 and 1404 are used in support of the stack operation. The CRF consists of even registers $R_2$, $R_4$ ... $R_{30}$ 1414 and odd registers $R_3$, $R_5$, ... $R_{31}$ 1416, both being (N−1)×M register files. A 2M-bit data memory 1418 load operation to R0∥R1 pushes a 2M-bit value onto the stack via Epath write ports 1420 and 1422. A read operation would pop 2M-bit values off the stack via Epath read port outputs 1426 and 1428. The odd and even stack Epath register files are each a P×Q file where typically Q=M and P equals the stack depth desired. The last in first out (LIFO) stack storage structure is managed by the hardware which provides the addressing and controls to give the correct LIFO operation. Two M-bit stacks can also be obtained, where R0 is the top of an even stack and R1 is the top of an odd stack. The Epath storage units 1402 and 1404 can be operated as first-in first-out (FIFO) devices.

Figure 15:
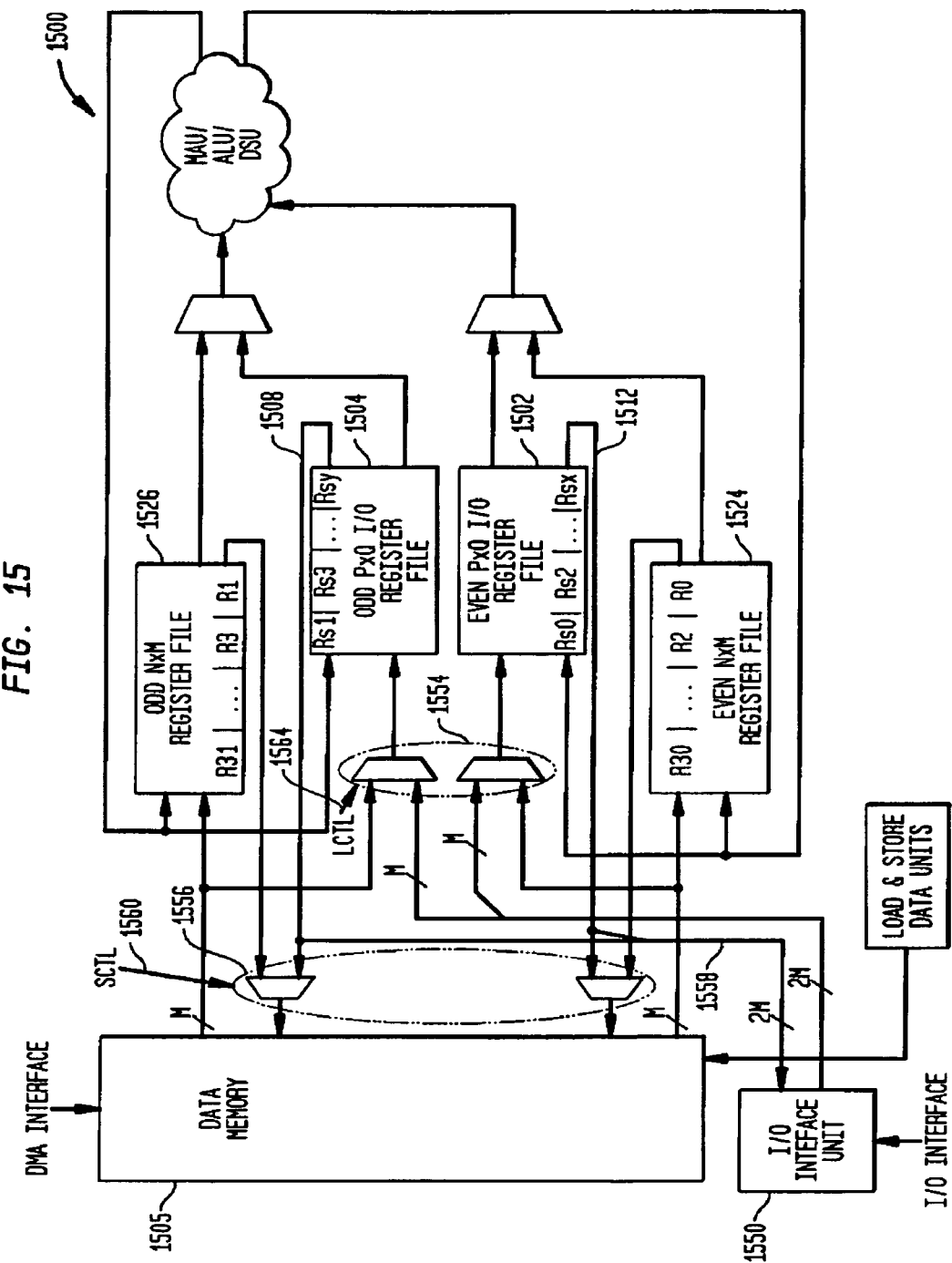
FIG. 15 illustrates an odd/even I/O operand Epath register circuit in accordance with the present invention.

To provide a more efficient input/output (I/O) interface to the processor, the Epath registers can be used not only for local processor memory accesses but also for I/O data accesses. This approach with an I/O Epath register file is shown in FIG. 15 which illustrates an odd/even I/O operand Epath register circuit 1500. In addition to the data memory 1505 interface provided by multiplexers 1554 and 1556, an I/O interface unit 1550 provides a tightly coupled data path to the odd/even Epath register file 1502 and 1504. For this implementation, the Epath register files are referenced as I/O register file (IORF). Note, for clarity of illustration, not all of the register file 1524 and 1526 or IORF 1502 and 1504 read and write ports are shown as may be used in a typical implementation. It is noted that in FIG. 15, multiplexers 1554 are provided to allow the Epath register files to be used for memory load operations as well as the storing of I/O data from I/O interface unit 1550. By defining a data storage area in the I/O interface unit 1550 that is part of the processor's memory address range, standard load instructions can be used to access data from either the data memory 1505 or the I/O interface unit 1550.

It will be appreciated that other methods can be used to stream data from an I/O interface unit to the Epath register files depending upon an application's needs. Load control LCTL signals 1564 that control multiplexers 1554 are based on I/O register mode control bits in a programmable mode control register and on instruction decode signals, for example. For I/O interfacing, the I/O register mode control bits take priority over instruction decode signals. The multiplexers 1556 provide a selectable path for either the register files 1524 and 1526 or the Epath register files 1502 and 1504 for storing data to data memory 1505. Store control SCTL signals 1560 that control multiplexers 1556 are based on instruction decode signals, for example. By defining a data storage area in the I/O interface unit 1550 that is part of the processor's memory address range, standard store instructions can be used to store results in either the memory 1505 or the I/O interface unit 1550. Note that an Epath register file output path 1558, a concatenation of the odd I/O register file 1504 output 1508 and the even I/O register file 1502 output 1512 also connects to the I/O interface unit 1550 for the purpose of storing processed data to I/O units.

The function of the I/O interface unit 1550 is to provide an efficient external signal interface to the processor for such functions as filters, A/D and D/A converters, and other I/O functions. The I/O interface unit also provides a mechanism to synchronize the transfer of signal data to the IORF 1502 and 1504. The I/O interface unit may also be used to provide a tight coupling to other digital functional units and other processors.

This unique I/O interfacing function is supported by the processing control provided by the indirect VLIW architecture. Instructions of the execute VLIW (XV) type allow control information to be provided to the PEs on an instruction-by-instruction basis such that mode bits, which are set for a period of time and must be reset to remove the mode context, are generally not needed. An XV instruction provides this information on a cycle by cycle and instruction by instruction basis. For example, as indicated by the XVX instruction 700 of FIG. 7, and an XVX2 instruction 1600 of FIG. 16, control information on how to use the Epath register file is provided in the XVX and XVX2 instruction itself. FIG. 16 shows details of an exemplary XVX2 instruction 1600 including a presently preferred encoding format 1610 and syntax/operation table 1620. For the XVX2 instruction 1600, a two bit field Ep 1605 is defined in the XVX2 instruction that causes all the VLIW instructions the XVX2 instruction invokes to use either the CRF or one of a number of I/O register files (IORFs) depending upon the state of the Ep bits. For example, with three IORFs and the Ep bits set to 00 1622, the CRF is used. With the Ep bits set to 01, 10, or 11, 1624, the specified Epath register 1, 2, or 3, respectively, is used. The arithmetic flags affected (ACF) are set by the individual simplex instruction in the slot specified by the setting of the UAF 'F=' parameter from the original LV instruction or as overridden by a 'F=[AMD]' parameter in the XVX2 instruction. The ACFs are not affected when 'F=N'. The XVX2 instruction supports a single cycle execution.

It is noted that in a small system a single IORF may be used requiring only a single Ep bit with one set of Epath register files while larger systems may have multiple IORFs and more than one Ep bit to specify the control of the multiple IORFs.

It is possible with the memory operand functions described above to have PEs that can access the local memory of other PEs in a pipelined fashion without requiring intermediate storage in the accessed memories local PE compute register file (CRF). For example, with reference to the 2×2 iVLIW processor 100, this aspect of the present invention allows PE1 103 to access the local data memory 155 of PE0 101. Similarly, PE3 107 can access the local data memory 161 of PE2 105. In making these accesses it is not necessary to use CRF space 136-139 in the PEs. This accessing across PEs is accomplished by pipelining load operations through the Epath registers and having the DSU select the Epath register for its source and target operands such that each PE can have access to the local memory of the other PEs.

Figure 17:
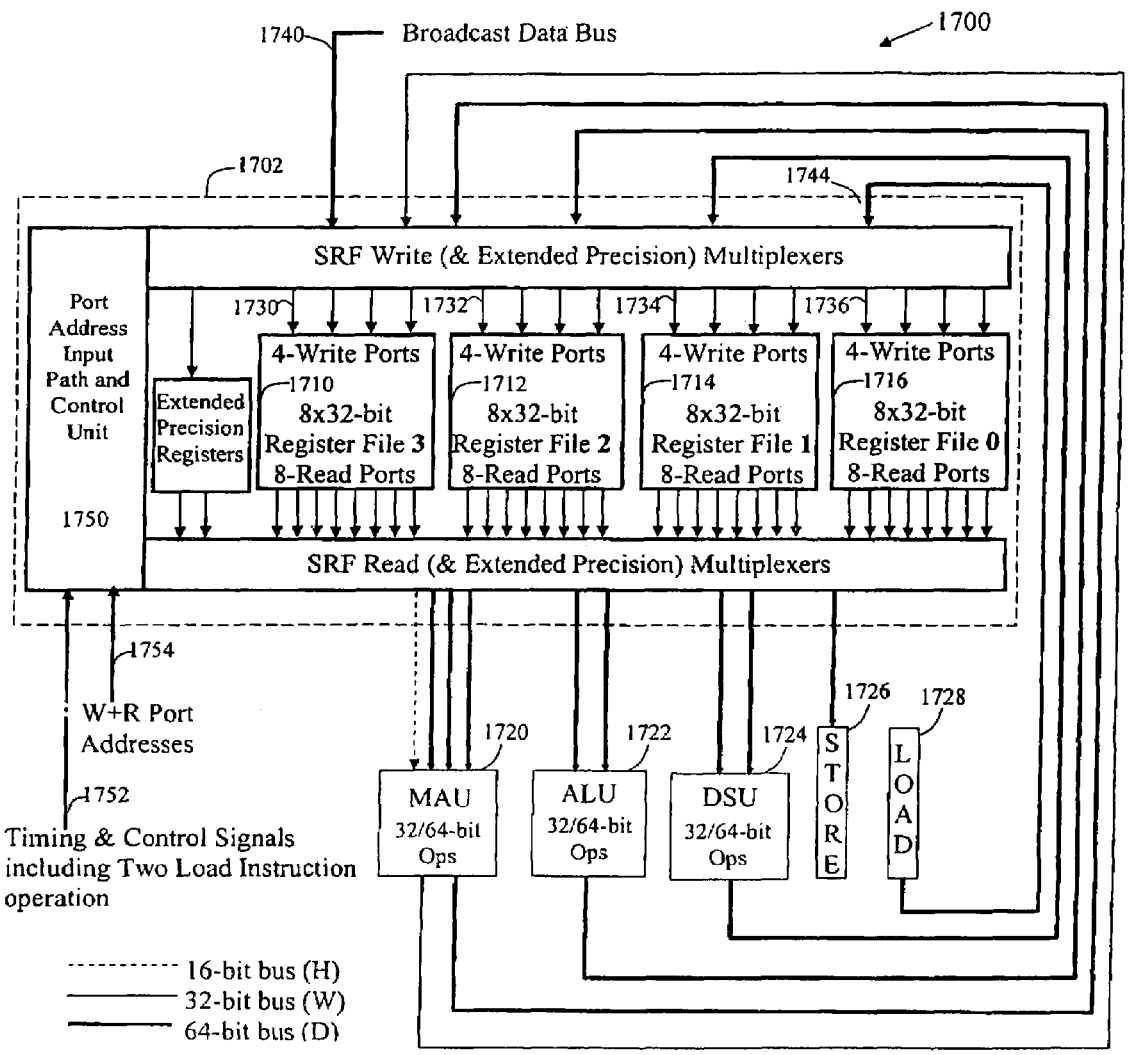
FIG. 17 illustrates an exemplary scalable register file (SRF) constructed to support increased instruction parallel operations in accordance with the present invention.

The Epath register files, as illustrated in the illustrative subsystems presented so far, provide additional operand storage which must be architecturally accounted for to support save and restore functions and to support the various functions described using XVX and XVX2 instructions. The Epath files did not generally impact the storage capacity of the CRF, nor did they generally interfere with existing usage of the CRF, but rather, they provided additional local operand storage space accessible in a parallel data path. By considering the original problem in a different manner, another way of increasing the number of memory loads and store paths can be achieved. In this alternative approach, the Epath register files are essentially incorporated into the CRF with minimal architectural changes and without changes to the underlying register file macros that make up the reconfigurable CRF. FIG. 17 illustrates this approach which builds upon a scalable register file (SRF) concept described in U.S. patent application Ser. No. 10/890,625, filed Jul. 14, 2004.

In FIG. 17, an SRF and execution unit subsystem 1700 is shown where the SRF 1702 is constructed from four 8×32 8 Read and 4 Write port register files (RFs) 1710, 1712, 1714, and 1716. MAU 1720, ALU 1722, DSU 1724, store 1726 and load 1728 execution units interface with the SRF 1702. The SRF and execution unit subsystem 1700 is designed such that the SRF provides 32×32-bit and 16×64-bit capacity and support for the existing data types as used in the 2×2 iVLIW processor 100 which implemented the CRFs in the SP and each PE with an odd 16×32-bit and an even 16×32- bit register file. The 32×32-bit and 16×64-bit CRF configurations as well as two other new configurations are shown in SRF configurations illustrated in FIGS. 18A-D.

In the 2×2 iVLIW processor 100, each CRF has a dedicated load unit write port configurable to load either 32-bit or 64-bit data. With an SRF constructed from four RF macros, there are four independent load unit write ports 1730, 1732, 1734, and 1736, one for each RF macro, and each port can be configured independently of the other RF macro ports. For the purposes of increasing the instruction-level parallelism and thereby increasing the memory access bandwidth as one option, four configurations constructed from a single RF macro are used.

In FIG. 18A, first file configuration 1800 illustrates word addressing to a single 32×32-bit register file 1802. The single register file 1802 may be suitably constructed out of the four 8×32-bit RF macros 1710, 1712, 1714, and 1716 as shown in FIG. 17 and described above. These four RF macros are configured in the addressing ranges shown as RF macros 1804, 1806, 1808, and 1810. RF0 macro 1804 responds to operand addresses R0-R7. RF1 macro 1806 responds to operand addresses R8-R15. RF2 macro 1808 responds to operand addresses R16-R23, and RF3 macro 1810 responds to operand addresses R24-R31. The action "responds" in this context means supporting the access of addressed data locations for read or write operations.

A second configuration, a 16×64-bit configuration 1820 is illustrated in FIG. 18B. It is constructed out of the same four 8×32-bit RF macros 1710, 1712, 1714, and 1716, but configured in the addressing ranges shown as RF macros 1822, 1824, 1826, and 1828 to support double-word addressing. In this second configuration, RF0 macro 1822 and RF1 macro 1824 respond to even/odd register pair addresses, identifying 64-bit double words, when addressed by even operand addresses R0-R14. RF2 macro 1826 and RF3 macro 1828 respond to even/odd register addresses, identifying 64-bit double words, when addressed by even operand addresses R16-R30.

Two additional configurations are shown that are used for increased concurrent load operations. FIG. 18C illustrates a third configuration 1840 where any two RF macros of the four RF macros 1710, 1712, 1714, and 1716 can be accessed simultaneously for load operations. For example, the four RF macros 1710, 1712, 1714, and 1716 are illustrated with load instruction addressable operand addresses as RF macros 1842, 1844, 1846, and 1848. RF0 macro 1842 responds to operand addresses R0-R7. RF1 macro 1846 responds to operand addresses R8-R15. RF2 macro 1844 responds to operand addresses R0-R7, and RF3 macro 1848 responds to operand addresses R8-R15. Instructions that execute on the arithmetic execution units, for example, MAU 1720, ALU 1722, and DSU 1724, treat the SRF 1700 as either first configuration 1800 or second configuration 1820 even though concurrent load instructions may be accessing the SRF 1700 in the third configuration 1840 where configuration 1840 is made up of two independently addressable sections 1842/1846 and 1844/1848.

FIG. 18D illustrates a fourth configuration 1860 where two double-word address load operations can independently and simultaneously occur to the SRF 1702. The four RF macros 1710, 1712, 1714, and 1716 are configured in two selectable groups 1862 and 1864 based on the load instructions' operand addresses. In this fourth configuration 1860, RF0 macro 1866 and RF1 macro 1868 respond to even/odd register pair addresses, identifying 64-bit double words, when addressed by even operand addresses R0-R14. RF2 macro 1870 and RF3 macro 1872 respond to even/odd register addresses, identifying 64-bit double words, when addressed by even operand addresses R0-R14. Instructions that execute on the arithmetic execution units, for example, MAU 1720, ALU 1722, and DSU 1724, view the SRF 1700 as either first configuration 1800 or second configuration 1820 even though concurrent load instructions may be accessing the SRF 1700 in the fourth configuration 1860, where configuration 1860 is made up of two independently addressable sections 1862 and 1864.

All four of these configurations are addressable from the instruction set. An example of an arithmetic instruction 1900 is shown in FIG. 19A. Instruction 1900 uses five bit operand addresses Rt 1902, Rx 1904 and Ry 1906 for word addressing the SRF in first configuration 1800 and for double-word addressing of the second configuration four bit operand addresses 1820, Rte 1912, Rxe 1914 and Rye 1916 are provided.

The Rt, Rx and Ry operand address fields are each 5-bits as shown in FIG. 19B address table 1920 for a representative 5-bit operand address. The five address bits A0-A4 provide a word selection address 1922 for up to 32 word locations in the SRF as shown in first configuration 1800. The SRF is constructed from four 8×32-bit RF macros that can be selected based on the high two bits A4 and A3 as an RFselect encoding 1924. Operand RFaddress bits A0-A2 1925 then provide the selection of one of the eight locations in the selected 8×32-bit RF macro.

In a similar manner, double-word addressing 1926, which requires the selection of two RF macros to obtain 64-bit accesses, uses a fixed organization of RF macros with RF0 and RF1 in a first group 1830, and RF2 and RF3 in the second group 1832 for second configuration 1820. This grouping represents one of a number of possible groupings of RFs but was chosen for implementation efficiency. The choice of which group to enable for accessing can be encoded in a single bit RFG A4 1928 as shown in FIG. 19B with A1-A3 1930 providing the operand address within the selected RF group. From a programmer's view, the double-words are addressed as even/odd pairs on even address boundaries so that bit A0 1932 is treated as equal to 0.

An example of a set 1950 of supported data types is shown in FIG. 19C. These data types are governed by a data type field such as Dtype field 1918 of FIG. 19A. The supported data types could include word W and packed word forms such as 4-byte, 2-halfword forms 1952 and double-word D0 and packed double-word forms such as 8-byte, 4-halfword and 2-word forms. These data type forms are also supported in third configuration 1840 and fourth configuration 1860. It is noted that each SRF port can be configured independently of the other SRF ports for the type of access configuration specified by an SIW or an XV instruction.

To obtain double-word load operations, the load unit write ports to the SRF RF macros are placed into either third or fourth configuration, as specified by the instructions' data type and by having two load instructions in a selected VLIW where, for example, local load instructions are in the primary load slot and load broadcast instructions are in the store instruction slot. The two load instruction operation is detected in decode, such as decode stage 191 of FIG. 1, and the SRF is informed of this via control signals 1752. For example, a two load operation could be indicated for an SIW double load instruction such as one of the double load instructions 1100 of FIG. 11. In another alternative, a two load operation indication would occur by having two load instructions in a VLIW as previously described with the apparatus of FIG. 10 using a load broadcast instruction and a load instruction in the VLIW. The load broadcast instruction causes the loading of data placed on a broadcast data bus, such as the broadcast data bus 1740, to be loaded at the instruction specified target address Rt. The local load instruction uses the normal load data path 1744. While other options are available under certain restrictions and not precluded by the present examples, a simple hardware implementation option would require that both load instructions use either a 32-bit data type or a 64-bit data type in order to commonly select either the third configuration or the fourth configuration. For such an implementation, it is required that the RFselect 1924, for a word third configuration, in the Rt operand field of each load instruction be different so that there are no conflicts on RF accesses. For example, for two word load operations, the load Rt and the load broadcast Rt must have the RFselect 1924, A3 and A4 bit combination, different in each instruction. Similarly, for two double-word load operations, the load Rt and the load broadcast Rt must have the RFG 1928, A4 bit, different in each instruction.

The address input path for each port and the SRF write and read multiplexing controls are handled by the port address input path and control unit 1750. For example, in order to support the first and second configurations, the SRF 1702 would need to support 4 write and 8 read ports of 32-bit and 64-bits, respectively. In order to also support the third and fourth configurations, requiring an additional load port, the SRF 1702 would be viewed as supporting 5 write and 8 read ports of 32-bits for the third configuration and of 64-bits for the fourth configuration. In general, there are W write and R read ports and correspondingly W write and R read port addresses 1754 where W and R depend upon the number of independent write and read operations required to be supported by the SRF, respectively. The number of SRF write ports can exceed the number of RF write ports available on any individual RF making up the SRF. Also, the number of SRF read ports can exceed the number of RF read ports available on any RF making up the SRF.

Note that other execution units can be supported for parallel operations in a similar manner to make use of the available write and read ports of the internal RF macros in an SRF. For example, the DSU 1724 is constructed internally of multiple separate DSU instruction specified functions such as PEXCHG for communicating between PEs, shift, rotate, permute, bit operations and the like. All the DSU functions or a subset of functions could be duplicated in other execution unit slots allowing support for increased parallelism of selected instructions and/or groups of instructions for selected algorithms. By duplicating support for the DSU communications instructions, such as PEXCHG, SPRCV and/or SPSEND for example, in another execution unit slot, such as the store slot, it would be possible to support communications between PEs while other DSU operations, such as shift, rotate, permute, or the like, are occurring in parallel in the DSU. It is noted that the load VLIW (LV) instruction and supporting hardware must allow the loading of these instructions in the desired slots, for example, a load broadcast instruction to be loaded into the store slot.

It is noted that increasing the capacity, data type support, and other configurations of an SRF is discussed in U.S. patent application Ser. No. 10/890,625, filed Jul. 14, 2004, and is not discussed further here.

While the present invention has been disclosed in the context of various specific illustrative embodiments, it will be recognized that the invention may be suitably applied to other environments and applications consistent with the claims which follow. For example, in some applications the operand Epath control bits could be placed in a processor control register located in, for example, the miscellaneous register file (MRF).

We claim:

1. An apparatus for processing parallel operand functions comprising:
   a first memory having a first memory read port and a first memory output;
   a second memory having a second memory read port and a second memory output;
   a first load facility connected to the first memory read port to fetch data;
   a second load facility connected to the second memory read port to fetch data;
   a register file (RF) having a plurality of registers, an RF output, and an RF write port, the RF write port connected to the first memory output;
   an extra path (Epath) storage having an identifying address independent of addresses of the registers in the RF, the Epath storage having an Epath output and an Epath write port, the Epath write port connected to the second memory output, the first and second load facility receiving instruction decode load information, the instruction decode load information specifying a first memory address, a second memory address, a first operation, and a second operation, the first load facility executing the first operation to load a first operand fetched from the first memory at the first memory address into the RF, and, in parallel, the second load facility executing the second operation to load a second operand fetched from the second memory at the second memory address into the Epath storage; and
   wherein the first memory further comprising a first memory write port and a first memory input, the apparatus further comprising:
   a store facility connected to the first memory write port to store data; and
   a second Epath storage having a second identifying address independent of addresses of the registers in the RF, the second Epath storage having an Epath input and an Epath read port, the Epath read port connected to the first memory input, the store facility receiving instruction decode store information, the instruction decode store information specifying a first memory store address, an Epath address of an Epath operand, and an operation to store the Epath operand to the first memory at the first memory store address.

2. The apparatus of claim 1 further comprising:
   an arithmetic facility having an input connected to the RF output and an input connected to the Epath output, the arithmetic facility receiving instruction decode arithmetic information, the instruction decode arithmetic information specifying an address of an RF operand from the RF, an address of an Epath operand from the Epath storage, and an arithmetic operation on the RF operand and the Epath operand; and
   a pipeline execution stage, the pipeline execution stage operable, in parallel with the execution of the first operation and the second operations, to read a third operand from the RF to the arithmetic facility, to read a fourth operand from the Epath storage to the arithmetic facility, and to operate on the third and fourth operands in the arithmetic facility.

3. The apparatus of claim 2 wherein in the next pipeline execution stage and in parallel,
   the first operand becomes the third operand, the second operand becomes the fourth operand, a new first operand is loaded from the first memory to the register file, and a new second operand is loaded from the second memory to the Epath storage.

4. The apparatus of claim 1 wherein the identifying address is specified by the instruction decode load information.

5. The apparatus of claim t wherein the identifying address is aliased to a register address within the RF plurality of addressable registers.

6. The apparatus of claim 1 further comprises:

an arithmetic facility having an output connected to the Epath input, the arithmetic facility receiving instruction decode arithmetic information, the instruction decode arithmetic information specifying the result of the arithmetic operation is stored to the Epath operand at the Epath address; and a first pipeline execution stage, the first pipeline execution stage operable, in parallel with the first operation and the second operations, to read a third operand from the RF to the arithmetic facility, to read a fourth operand from the Epath storage to the arithmetic facility, to operate on the third and fourth operands in the arithmetic facility generating a result operand, to write the result operand of the arithmetic facility to the Epath storage, and to store an Epath storage operand to the first memory.

7. The apparatus of claim 1 wherein the second Epath storage is an Epath register file having a plurality of addressable registers independent of the register file.

8. The apparatus of claim 1 wherein the Epath storage is an Epath register file having a plurality of Epath addresses associated with registers in the Epath register file, wherein the Epath addresses are independent of the addresses of the registers in the RF.

9. The apparatus of claim 1 wherein the identifying address is aliased to a register address within the RF plurality of registers, the apparatus further comprising:

a plurality of additional registers associated with the Epath storage and the aliased register address acting as a first register address defining an Epath last in first out (LIFO) stack.

10. The apparatus of claim 9 wherein the Epath LIFO stack is operative to push values onto the stack when the Epath aliased register is written and to pop values off of the stack when the Epath aliased register is read.

11. The apparatus of claim 1 wherein the instruction decode load information further comprises a load Epath register control bit, a select Epath register control bit, and VLIW memory information for accessing a VLIW, the instruction decode load information obtained by decoding an indirect execute VLIW instruction.

12. The apparatus of claim 11 wherein the instruction decode load information is obtained by decoding a VLIW having two load type instructions.

13. The apparatus of claim 1 further comprising:

a first address register file (ARF) supporting a first memory load operation;

a second ARF supporting a second memory load operation, wherein the instruction decode load information further comprises an ARF address for accessing the same address location in the first ARF and second ARF, the instruction decode load information obtained by decoding a double independent load instruction.

14. An apparatus for processing parallel operand functions on data stored in a scalable register file (SRF) comprising:

a first memory having a first memory read port and a first memory output;

a second memory having a second memory read port and a second memory output;

a first load facility connected to the first memory read port to fetch data;

a second load facility connected to the second memory read port to fetch data;

a SRF comprising a plurality of register files (RF) each RF having a plurality of registers, each RF having independent read ports and independent write ports, the independent read ports connected by SRF read multiplexers, the independent write ports connected by SRF write multiplexers, a SRF write multiplexer first input connected to the first memory output, and a SRF write multiplexer second input connected to the second memory output;

a control unit for configuring the SRF write multiplexers for two load write SRF operations, the first and second load facility and control unit receiving instruction decode load information, the instruction decode load information specifying a first memory address, a second memory address, control unit configuration for two load write SRF operations, a first operation, and a second operation, the first load facility executing the first operation to load a first operand fetched from the first memory at the first memory address into one of the plurality of RFs in the SRF, and in parallel the second load facility executing the second operation to load a second operand fetched from the second memory at the second memory address into a second RF of the plurality of RFs in the SRF.

15. The apparatus of claim 14 wherein the number of SRF write ports exceeds the number of RF write ports of any individual RF of the plurality of RFs.

16. The apparatus of claim 14 wherein the number of SRF read ports exceeds the number of RF read ports of any individual RF of the plurality of RFs.

* * * * *